US009661617B2

United States Patent
Dai et al.

(10) Patent No.: US 9,661,617 B2
(45) Date of Patent: May 23, 2017

(54) DETERMINATION METHOD AND DEVICE FOR RESOURCES IN PHYSICAL UPLINK CONTROL CHANNEL

(71) Applicant: ZTE CORPORATION, Guangdong (CN)

(72) Inventors: Bo Dai, Shenzhen (CN); Yijian Chen, Shenzhen (CN); Senbao Guo, Shenzhen (CN); Yunfeng Sun, Shenzhen (CN); Zhisong Zuo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 99 days.

(21) Appl. No.: 14/377,240

(22) PCT Filed: Jun. 26, 2013

(86) PCT No.: PCT/CN2013/000764
§ 371 (c)(1),
(2) Date: Aug. 7, 2014

(87) PCT Pub. No.: WO2014/000421
PCT Pub. Date: Jan. 3, 2014

(65) Prior Publication Data
US 2016/0192348 A1    Jun. 30, 2016

(30) Foreign Application Priority Data

Jun. 28, 2012 (CN) .......................... 2012 1 0218686

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1861* (2013.01); *H04L 5/0055* (2013.01);
(Continued)

(58) Field of Classification Search
None
See application file for complete search history.

(56) References Cited

U.S. PATENT DOCUMENTS

| | | | | |
|---|---|---|---|---|
| 2013/0242890 A1* | 9/2013 | He | ...................... | H04W 52/243 370/329 |
| 2014/0328297 A1* | 11/2014 | She | ...................... | H04L 5/0091 370/329 |
| 2015/0043355 A1* | 2/2015 | Kim | ........................ | H04J 11/00 370/241 |

FOREIGN PATENT DOCUMENTS

| | | |
|---|---|---|
| CN | 101442818 A | 5/2009 |
| CN | 102316595 A | 1/2012 |
| WO | 2010026287 A1 | 3/2010 |

OTHER PUBLICATIONS

Multiplexing of ePDCCH for different users; Nokia, Nokia Siemens Networks; 3GPP TSG RAN WG1 Meeting #68bis; Jeju, Korea, Mar. 26-30, 2012; R1-121288.

(Continued)

*Primary Examiner* — Sulaiman Nooristany
(74) *Attorney, Agent, or Firm* — Ling Wu; Stephen Yang; Ling and Yang Intellectual Property

(57) ABSTRACT

A method and apparatus for determining resources in a Physical Uplink Control Channel (PUCCH) are disclosed. The method includes: an apparatus determining a channel resource index of the PUCCH according to physical resources of an enhanced Physical Downlink Control Channel (ePDCCH), wherein, the PUCCH is used for carrying positive acknowledgement/negative acknowledgement (ACK/NACK) information about a Physical Downlink Shared Channel (PDSCH) indicated by the ePDCCH; and the physical resources of the ePDCCH include: any one or more of a physical resource block, an enhanced control channel element and an antenna port index. The embodi- (Continued)

ments of the present document can ensure the compatibility between an LTE-Advanced system and an LTE Release-8 system, and facilitate improving the system capacity and the scheduling flexibility of the LTE-Advanced system, thereby enabling an LTE-Advanced terminal to obtain a maximum frequency selectivity gain.

16 Claims, 2 Drawing Sheets

(51) Int. Cl.
*H04W 72/00* (2009.01)
*H04L 5/00* (2006.01)
*H04W 72/12* (2009.01)
*H04L 1/16* (2006.01)

(52) U.S. Cl.
CPC ......... *H04W 72/00* (2013.01); *H04W 72/042* (2013.01); *H04L 1/1607* (2013.01); *H04W 72/12* (2013.01)

(56) References Cited

OTHER PUBLICATIONS

HARQ-ACK resource allocation for date scheduled via ePDCCH; Nokia, Nokia Siemens Networks; 3GPP TSG RAN WG1 Meeting #69; Prague, Czech Republic, May 21-25, 2012. R1-122428.
HARQ-ACK PUCCH Resources in Response to ePDCCH Detections; Samsung; 3GPP TSG RAN WG1 Meeting #69; Prague, Czech Republic, May 21-25, 2012. R1-122259.
Need of multiplexing localized and distributed transmission in one PRB pair; Huawei et al.; Prague, Czech Republic, May 21-25, 2012, 3GPP TSG WGI Meeting #69, R1-121965.
Discussion on PUCCH Resource for ePDCCH; LG Electronics; Prague, Czech Republic, May 21-25, 2012, 3GPP TSG WGI Meeting #69, R1-122314.
Further discussion on E-PDCCH structure; Samsung; Jeju, Korea, Mar. 26-30, 2012, 3GPP TSG WGI #68bis, R1-121645.
International Search Report for PCT/CN2013/000764 dated Aug. 29, 2013.
Sharp, PUCCH resource management for CoMP Scenarios, Mar. 26-30, 2012 (Mar. 26-30, 2012) R1-121352, 3GPP TSG RAN WGA Meeting #68bis, the whole document.

* cited by examiner

DETERMINATION METHOD AND DEVICE FOR RESOURCES IN PHYSICAL UPLINK CONTROL CHANNEL

TECHNICAL FIELD

The present document relates to the field of communications, and in particular, to a method and apparatus for determining resources in a Physical Uplink Control Channel (PUCCH) in a system.

BACKGROUND OF THE RELATED ART

FIG. 1 is a diagram of a frame structure of a Frequency Division Duplex (FDD) mode of a Long Term Evolution (LTE) system, and as shown in FIG. 1, in the frame structure of the FDD mode, one 10 ms-radio frame is comprised of 20 slots with a length of 0.5 ms and numbered from 0 to 19, and slots 2i and 2i+1 constitute a subframe i with a length of 1 ms. FIG. 2 is a diagram of a frame structure of a Time Division Duplex (TDD) mode of an LTE system, and as shown in FIG. 2, in the frame structure of the TDD mode, one 10 ms radio frame is comprised of 2 half frames with a length of 5 ms, each of which includes 5 subframes with a length of 1 ms. Subframe i is defined as 2 slots 2i and 2i+1 with a length of 0.5 ms. In the two frame structures, for a normal Cyclic Prefix (normal CP), one slot includes 7 symbols with a length of 66.7 us, wherein, a CP length of the first symbol is 5.12 us, and a CP length of each of the remaining 6 symbols is 4.69 us; and for an extended Cyclic Prefix, one slot includes 6 symbols, and a CP length of each of all symbols is 16.67 us.

In a release (R for short) 8/9 of the LTE system and R10 of an LTE-Advanced system, a Physical Downlink Control Channel (PDCCH for short) for transmitting physical layer control signaling is generally configured to be transmitted on first N Orthogonal Frequency Division Multiplexing (OFDM) symbols of a subframe, and the N symbols are generally be referred to as a control signaling transmission region. Here, in order to be distinguished from a control signaling transmission region newly added in the new release, the control signaling transmission region of the R8/9/10 is referred to as a first control signaling transmission region in the embodiments of the present document.

Available transmission resources of the first control signaling transmission region are divided into multiple Control Channel Element (CCE) resource units, and resources occupied by the control information are allocated with the CCE being a unit. The resource unit CCE here can further be subdivided into multiple Resource Element Groups (REGs), and one CCE is comprised by multiple non-localized REGs. Generally, 9 REGs constitute one CCE, and each REG is comprised of multiple basic resource units of Resource Elements (REs).

It can be seen that the control signaling transmission resources allocated by a user are not localized, and bring out many difficulties to the implementation of the closed-loop precoding technology in a multi-antenna system, and therefore, only the diversity technology can be used in the control signaling region, and it is difficult to use the closed-loop precoding technology. The primary reason is that it is difficult to design the demodulation reference signal and channel state information feedback in the first precoding region, and therefore, the control signaling in all the existing releases only support non-localized resource transmission and diversity technologies.

In releases after R10, in order to enhance the transmission capacity of the control channel and support control signaling of more users, it is considered to develop new control channel region in the design, and control signaling transmission resources of the same User Equipment (UE) may be localized time-frequency resources, to support the closed-loop precoding technology, and enhance the transmission performance of the control information. The control signaling regions of the new and old releases are as shown in FIG. 3.

For the control signaling of the new release, a part of transmission resources are set aside from the Physical Downlink Shared Channel (PDSCH) transmission region of the original R8/9/10 to be used as the second control signaling transmission region, which enables to support the closed-loop precoding technology while transmitting the control signaling, and enhances the capacity of the control signaling to support control signaling of more users. Here, the second control signaling transmission region can reuse a Demodulation Reference Signal (DMRS) in R10 to demodulate the control signaling, which well supports the precoding technology. In addition, the second control signaling transmission region is in units of Resource Blocks (RBs), which can well perform interference coordination. Meanwhile, in consideration of robustness of the transmission and the condition that there is no channel information, in the second control signaling transmission region, the DMRS can also support the open-loop diversity technology, for example, a Space-Frequency Block Coding (SFBC) technology.

In order to better understand the background of the technical scheme of the present document, the definition of the resources of the LTE-A will be simply introduced blow. In the LTE, one RE is one subcarrier on one OFDM symbol, while one downlink physical RB is comprised of 12 localized subcarriers and 14 (12 when an extended CP is used) localized OFDM symbols, and the RB is 180 kHz in the frequency domain and is generally a time length of one slot in the time domain, as shown in FIG. 4 (one 5M system). When allocating resources, the LTE/LTE-A system allocates the resources with RB being a basic unit.

For the PDSCH dynamically scheduled in an LTE FDD mode, resource indexes for transmitting a Physical Uplink Control Channel (PUCCH) carrying a Hybrid Automatic Repeat Request Acknowledgment (HARQ-ACK) in an uplink are implicitly mapped by a minimum CCE index corresponding to a PDCCH allocated to the user on scheduled downlink subframes. That is, $n_{PUCCH}^{(1)} = n_{CCE} + N_{PUCCH}^{(1)}$, wherein, $n_{PUCCH}^{(1)}$ is a PUCCH resource index for transmitting a HARQ-ACK by a user, $n_{CCE}$ is a first CCE index for transmitting the PDCCH, and $N_{PUCCH}^{(1)}$ is configured by a higher layer. For the PDSCH transmission indicated by the PDCCH or the transmission released by the downlink Semi-Persistent Scheduling (SPS) indicated by the PDCCH in the LTE TDD mode, resource indexes for transmitting the PUCCH carrying the HARQ-ACK in the uplink are obtained after block interleaving the CCE indexes corresponding to the PDCCH allocated to the user on the scheduled downlink subframes. As there will be a configuration in the TDD mode that the number of downlink subframes is greater than the number of uplink subframes in one radio frame, a concept of feedback window is defined. The feedback window is all downlink subframes corresponding to uplink subframes (it should be illustrated that "corresponding" here refers to all these downlink subframes feed back confirmation information in the uplink subframes).

For the TDD mode, as there may be a scenario that the number of downlink subframes is greater than the number of uplink subframes in one radio frame, feedback information of multiple downlink subframes may be transmitted in the same uplink subframe. Such multiple downlink subframes corresponding to one uplink subframe are referred to as a feedback window.

For PDSCH transmission not indicated by the PDCCH, $n_{PUCCH}^{(1)}$ is configured by a higher layer and is decided by table one. Table one illustrates a relationship between PUCCH resource indexes and signaling.

TABLE ONE

Relationship between PUCCH resource indexes and signaling

| Transmit Power Control (TPC) domain value | $n_{PUCCH}^{(1)}$ |
|---|---|
| '00' | First PUCCH resource index configured by a higher layer |
| '01' | Second PUCCH resource index configured by a higher layer |
| '10' | Third PUCCH resource index configured by a higher layer |
| '11' | Fourth PUCCH resource index configured by a higher layer |

For downlink SPS PDSCH indicated by Downlink Control Information (DCI for short) signaling, $n_{PUCCH}^{(1)}$ of the PDSCH is determined by one of four resources configured by a higher layer indicated by a TPC domain.

At present, in a process of constant development of the LTE-Advanced, the system capacity is expanded to support increasing requirements on the number of users, and the existing PDCCH can not satisfy requirements on more advanced wireless communication systems. To this end, in the discussion of the 3rd Generation Partnership Project (3GPP), an Enhanced PDCCH (ePDCCH) is introduced to enhance the performance of the PDCCH, and at the same time, a new PDCCH transmission region is introduced, and an Enhanced Control Channel Element (eCCE) for carrying an ePDCCH is defined. At this time, how to obtain PUCCH resources for transmitting ACK/NACK corresponding to the PDSCH of the ePDCCH is a problem to be solved.

SUMMARY OF THE INVENTION

For the problem of how to obtain the PUCCH resources for transmitting the ACK/NACK corresponding to the PDSCH of the ePDCCH, the embodiments of the present document provide a method and apparatus for determining resources in a physical uplink control channel to at least solve the above problem.

The embodiments of the present document provide a method for determining resources in a Physical Uplink Control Channel (PUCCH), comprising:

an apparatus determining a channel resource index $n_{PUCCH}^{(1)}$ of the PUCCH according to physical resources of an enhanced Physical Downlink Control Channel (ePDCCH), wherein, the PUCCH is used for carrying positive acknowledgement/negative acknowledgement (ACK/NACK) information about a Physical Downlink Shared Channel (PDSCH) indicated by the ePDCCH; and the physical resources of the ePDCCH comprise: any one or more of a physical resource block, an enhanced Control Channel Element (eCCE) and an antenna port index.

The above method further comprises the following features: in the step of an apparatus determining a channel resource index $n_{PUCCH}^{(1)}$ of the PUCCH according to physical resources of an ePDCCH, physical resources for transmitting the ePDCCH in a distributed transmission mode and physical resources for transmitting the ePDCCH in a localized transmission mode share the same region;

or the physical resources for transmitting the ePDCCH in a distributed transmission mode and the physical resources for transmitting the ePDCCH in a localized transmission mode are configured independently.

The above method further comprises the following features: the step of an apparatus determining a channel resource index $n_{PUCCH}^{(1)}$ of the PUCCH according to physical resources of an ePDCCH comprises: the apparatus determining an initial position $N_{PUCCH}^{Start}$ of channel resources of the PUCCH, wherein, $N_{PUCCH}^{Start}$ is an initial position $N_{PUCCH}^{(1)}$ of channel resources of a PUCCH corresponding to an existing PDCCH;

or $N_{PUCCH}^{Start}$ is the initial position $N_{PUCCH}^{(1)}$ of the channel resources of the PUCCH corresponding to the existing PDCCH plus a predefined value D, wherein, D represents a maximum number of channel resources of the PUCCH corresponding to the PDCCH in an uplink subframe where the PUCCH is located; or D represents a number of Control Channel Elements (CCEs) in the subframe where the ePDCCH is located;

or, $N_{PUCCH}^{Start}$ is the initial position $N_{PUCCH}^{(1)}$ of the channel resources of the PUCCH corresponding to the existing PDCCH plus the predefined value D plus V, wherein, V is determined by signaling;

or $N_{PUCCH}^{Start}$ is determined by signaling;

or $N_{PUCCH}^{Start}$ is an initial position of PUCCH format 1a/1b resources in the uplink subframe where the PUCCH is located.

The above method further comprises the following features: in the step of the apparatus determining an initial position $N_{PUCCH}^{Start}$ of channel resources of the PUCCH, for a time division duplex system, $N_{PUCCH}^{Start}$ s are the same or different in different uplink subframes.

The above method further comprises the following features: in the step of the apparatus determining an initial position $N_{PUCCH}^{Start}$ of channel resources of the PUCCH, $N_{PUCCH}^{Start}$ s of channel resources of the PUCCH corresponding to the ePDCCH in different transmission modes are the same or different.

The above method further comprises the following features: the step of an apparatus determining a channel resource index $n_{PUCCH}^{(1)}$ of the PUCCH according to physical resources of an ePDCCH comprises: the apparatus determining an offset, wherein, the offset is a fixed value, or is determined according to one of the following information or a combination thereof:

antenna port information of the ePDCCH, indication signaling, a transmission mode of the ePDCCH, a position of the ePDCCH in the physical resource block, an eCCE index corresponding to the ePDCCH, and an enhanced resource unit group index corresponding to the ePDCCH.

The above method further comprises the following features: the apparatus determines the offset according to one of the following steps or a combination thereof:

A) establishing a correspondence between the antenna port information and the offset, determining the offset according to the antenna port information used by the ePDCCH; wherein, the antenna port information used by the ePDCCH includes an antenna port index; or the antenna port information used by the ePDCCH includes an antenna port index and initial sequence information corresponding to the antenna port;

B) establishing a correspondence between the antenna port information and the offset, and determining the offset according to the antenna port information used by the ePDCCH and the indication signaling;

C) determining the offset according to the indication signaling;

D) when the ePDDCH is in a distributed transmission mode, the offset corresponding to the ePDCCH being 0 or determined according to the indication signaling, and when the ePDCCH is in a localized transmission mode, determining an offset corresponding to the ePDCCH according to any of the steps A to C;

The above method further comprises the following features: in the step B, determining the offset according to the antenna port information used by the ePDCCH and indication signaling comprises:

Offset=offset1+ARI, wherein, offset1 is determined according to the antenna port index of the ePDCCH, and the ARI value is configured by the indication signaling.

The above method further comprises the following features: determining the offset according to a combination of the step B and the step D comprises:

Offset=offset1+ARI, wherein, when the ePDCCH is in a distributed transmission mode, offset1 is 0, and when the ePDCCH is in a localized transmission mode, offset1 is determined according to the antenna port index of the ePDCCH, and the ARI value is configured by the indication signaling.

The above method further comprises the following features: the step of an apparatus determining a channel resource index $n_{PUCCH}^{(1)}$ of the PUCCH according to physical resources of an ePDCCH comprises:

the apparatus determining $n_{PUCCH}^{(1)}$ according to the following equation:

$n_{PUCCH}^{(1)} = f(n_{PR}) + \text{offset} + N_{PUCCH}^{Start}$;

wherein, $n_{PR}$ is a renumbered physical resource block index for carrying the ePDCCH, or $n_{PR}$ is an eCCE index for carrying the ePDCCH; and $N_{PUCCH}^{Start}$ is an initial position of the channel resources of the PUCCH.

The above method further comprises the following features:

when the apparatus transmits all ACKs/NACKs of the PDSCHs on M downlink subframes on an uplink subframe n, the step of an apparatus determining the channel resource index $n_{PUCCH}^{(1)}$ of the PUCCH according to physical resources of an ePDCCH comprises:

for a downlink subframe k, the apparatus determining a channel resource index $n_{PUCCH,m}^{(1)}$ of the PUCCH according to a physical resource index $n_{PR}$ of the ePDCCH on the downlink subframe k:

$n_{PUCCH,m}^{(1)} = (M-m-1) \times N_x + m \times N_x + f(n_{PR}) + \text{offset} + N_{PUCCH}^{Start}$;

wherein, m is a sequence number of the downlink subframe k where the received PDSCH is located in the M downlink subframes corresponding to the uplink subframe n, and $0 \leq m \leq M-1$; $N_x$ is a predefined parameter, and the selection of x ensures $N_x \leq f(n_{PR}) + \text{offset} \leq N_{x+1}$, $x \in \{0, 1, \Lambda, r-1\}$ and $$N_x = \left\lfloor \frac{N_{ePDCCH}^{Total}}{r} \right\rfloor \times x, \text{ or } N_x = \left\lfloor \frac{N_{ePDCCH}^{Total} \times x}{r} \right\rfloor, \text{ or}$$

-continued $$N_x = \left\lfloor N_{ePDCCH}^{Total} \times \frac{x}{r} \right\rfloor, \text{ or } N_x = \left\lfloor \frac{N_{ePDCCH}^{Total}}{r} \times x \right\rfloor,$$

$N_{ePDCCH}^{Total}$ represents a total number of PUCCHs corresponding to the ePDCCH region of one downlink subframe or is indicated by the signaling; r is greater than or equal to 1; $n_{PR}$ is a renumbered physical resource block index for carrying the ePDCCH, or $n_{PR}$ is an eCCE index for carrying the ePDCCH; and $N_{PUCCH}^{Start}$ is an initial position of the channel resources of the PUCCH.

The above method further comprises the following features:

when the apparatus transmits all ACKs/NACKs of the PDSCH on M downlink subframes on an uplink subframe n, the step of an apparatus determining the channel resource index $n_{PUCCH}^{(1)}$ of the PUCCH according to physical resources of an ePDCCH comprises:

for a downlink subframe k, the apparatus determining a channel resource index $n_{PUCCH,m}^{(1)}$ of the PUCCH according to a physical resource block index $n_{PR}$ of the ePDCCH on the downlink subframe k:

$$n_{PUCCH,m}^{(1)} = \sum_{q=0}^{m} N_{ePDCCH,q}^{Total} + f(n_{PR}) + \text{offset} + N_{PUCCH}^{Start};$$

wherein, m is a sequence number of the downlink subframe k where the received PDSCH is located in the M downlink subframes corresponding to the uplink subframe n, and $0 \leq m \leq M-1$; $N_{ePDCCH,m}^{Total}$ represents a total number of PUCCHs corresponding to the ePDCCH region of the downlink subframe k or is indicated by the signaling; $n_{PR}$ is a renumbered physical resource block index for carrying the ePDCCH, or $n_{PR}$ is an eCCE index for carrying the ePDCCH; and $N_{PUCCH}^{Start}$ is an initial position of the channel resources of the PUCCH.

The above method further comprises the following features:

when $n_{PR}$ is $n_{PRB}$, and $n_{PRB}$ is a renumbered physical resource block index for carrying the ePDCCH, $$f(n_{PR}) = f(n_{PRB}) = n_{PRB} \times h; n_{PRB} = \left\lfloor \frac{n_{eCCE}}{h} \right\rfloor,$$

$n_{eCCE}$ is an eCCE index for carrying the ePDCCH;

wherein, h is a maximum number of the uplink control channel resources corresponding to one physical resource block carrying the ePDCCH, or h is a number of eCCEs included in one physical resource block carrying the ePDCCH, or h is indicated by signaling, or h is a predefined positive integer.

The above method further comprises the following features: the method further comprises: the apparatus determining $n_{PRB}$ by means of:

for the ePDCCH in a localized transmission mode, determining that $n_{PRB}$ is a renumbered maximum or minimum physical resource block index for carrying the ePDCCH; or for the ePDCCH in a distributed transmission mode, determining $n_{PRB}$ according to the maximum or minimum D-eCCE index for carrying the ePDCCH; wherein, the D-eCCE is an eCCE for the ePDCCH in the distributed transmission mode.

The above method further comprises the following features: the step of determining $n_{PRB}$ according to the maximum or minimum D-eCCE index for carrying the ePDCCH comprises:

mapping one D-eCCE onto h physical resource blocks, and dividing all numbered D-eCCEs into N groups, wherein, each group includes h D-eCCEs; establishing one-to-one correspondence between h D-eCCEs in one group and the h physical resource blocks, wherein, the h D-eCCEs in the same group correspond to a same antenna port and are mapped onto a same physical resource block, or the h D-eCCEs in the same group are mapped onto a same physical resource block; and determining the physical resource block index $n_{PRB}$ according to a physical resource block index corresponding to a position of the maximum or minimum D-eCCE index for carrying the ePDCCH in the above divided groups;

or when the maximum or minimum D-eCCE index is an odd number, determining that the physical resource block index $n_{PRB}$ is a minimum physical resource block index where the maximum or minimum D-eCCE index is located, and when the maximum or minimum D-eCCE index is an even number, determining that the physical resource block index $n_{PRB}$ is a maximum physical resource block index where the maximum or minimum D-eCCE index is located;

or when the maximum or minimum D-eCCE index is an odd number, determining that the physical resource block index $n_{PRB}$ is a maximum physical resource block index where the maximum or minimum D-eCCE index is located, and when the maximum or minimum D-eCCE index is an even number, determining that the physical resource block index $n_{PRB}$ is a minimum physical resource block index where the maximum or minimum D-eCCE index is located.

The above method further comprises the following features:

when $n_{PR}$ is $n_{eCCE}$, and $n_{eCCE}$ is an eCCE index for carrying the ePDCCH, $$f(n_{PR}) = \left\lfloor \frac{n_{eCCE}}{h} \right\rfloor$$

or $f(n_{PR})=n_{eCCE}$;

wherein, h is a maximum number of the uplink control channel resources corresponding to one physical resource block carrying the ePDCCH, or h is a number of eCCEs included in one physical resource block carrying the ePDCCH, or h is indicated by signaling, or h is a predefined positive integer.

The above method further comprises the following features: the method further comprises: the apparatus determining $n_{eCCE}$ by means of:

for the ePDCCH in a localized transmission mode, determining that $n_{eCCE}$ is a maximum or minimum L-eCCE index for carrying the ePDCCH; or determining that $n_{eCCE}$ is a maximum or minimum L-eCCE index for carrying the ePDCCH plus Total-DeCCE; wherein, Total-DeCCE represents a total number of available D-eCCEs or is indicated by signaling; or for the ePDCCH in a distributed transmission mode, determining $n_{eCCE}$ according to the maximum or minimum D-eCCE index for carrying the ePDCCH.

The above method further comprises the following features: the step of determining $n_{eCCE}$ according to the maximum or minimum D-eCCE index for carrying the ePDCCH comprises:

determining that $n_{eCCE}$ is a maximum or minimum D-eCCE index for carrying the ePDCCH; or determining that $n_{eCCE}$ is a maximum or minimum D-eCCE index for carrying the ePDCCH plus Total-LeCCE; wherein, Total-DeCCE represents a total number of available L-eCCEs or is indicated by signaling;

or mapping one D-eCCE onto h L-eCCEs, and dividing all numbered D-eCCEs into N groups, wherein, each group includes h D-eCCEs; establishing one-to-one correspondence between h D-eCCEs in one group and the h L-eCCEs, wherein, the h D-eCCEs in the same group correspond to the same antenna port and are mapped onto the same L-eCCE, or the h D-eCCEs in the same group are mapped onto the same L-eCCE; and determining $n_{eCCE}$ according to an L-eCCE index corresponding to a position of the maximum or minimum D-eCCE index for carrying the ePDCCH in the above divided groups;

or mapping one D-eCCE onto 2 L-eCCEs, when the maximum or minimum D-eCCE index is an odd number, determining that $n_{eCCE}$ is a minimum L-eCCE index where the maximum or minimum D-eCCE index is located, and when the maximum or minimum D-eCCE index is an even number, determining that $n_{eCCE}$ is a maximum L-eCCE index where the maximum or minimum D-eCCE index is located; or when the maximum or minimum D-eCCE index is an odd number, determining that $n_{eCCE}$ is a maximum L-eCCE index where the maximum or minimum D-eCCE index is located, and when the maximum or minimum D-eCCE index is an even number, determining that $n_{eCCE}$ is a minimum L-eCCE index where the maximum or minimum D-eCCE index is located;

wherein, the L-eCCE is an eCCE for the ePDCCH in the localized transmission mode, and the D-eCCE is an eCCE for the ePDCCH in the distributed transmission mode.

The above method further comprises the following features: the method further comprises: the apparatus numbering the physical resources of the ePDCCHs according to one of the following modes:

numbering all configured physical resources of the ePDCCHs in order;

firstly concatenating physical resources for ePDCCHs in different transmission modes, and then numbering the physical resources of the ePDCCHs in the concatenated order; and numbering the physical resources for the ePDCCHs in different transmission modes respectively.

The above method further comprises the following features: the apparatus is a terminal or a base station.

The embodiments of the present document further provide an apparatus, comprising: a channel resource determination unit, configured to determine a channel resource index $n_{PUCCH}^{(1)}$ of a Physical Uplink Control Channel (PUCCH) according to physical resources of an enhanced Physical Downlink Control Channel (ePDCCH), wherein, the PUCCH is used for carrying positive acknowledgement/negative acknowledgement (ACK/NACK) information about a Physical Downlink Shared Channel (PDSCH) indicated by the ePDCCH; and the physical resources of the ePDCCH comprise: any one or more of a physical resource block, an enhanced control channel element and an antenna port index.

The above apparatus further comprises the following features: the channel resource determination unit is configured to determine an initial position $N_{PUCCH}^{Start}$ of channel resources of the PUCCH, wherein, $N_{PUCCH}^{Start}$ is an initial position $N_{PUCCH}^{(1)}$ of channel resources of a PUCCH corresponding to an existing PDCCH;

or $N_{PUCCH}^{Start}$ is an initial position $N_{PUCCH}^{(1)}$ of the channel resources of the PUCCH corresponding to the existing PDCCH plus a predefined value D, wherein, D represents a maximum number of channel resources of the PUCCH corresponding to the PDCCH in an uplink subframe where the PUCCH is located; or D represents a number of Control Channel Elements (CCEs) in an subframe where the ePDCCH is located;

or, $N_{PUCCH}^{Start}$ is the initial position $N_{PUCCH}^{(1)}$ of the channel resources of the PUCCH corresponding to the existing PDCCH plus the predefined value D plus V, wherein, V is determined by signaling;

or $N_{PUCCH}^{Start}$ is determined by signaling;

or $N_{PUCCH}^{Start}$ is an initial position of PUCCH format 1a/1b resources in the uplink subframe where the PUCCH is located.

The above apparatus further comprises the following features: for a time division duplex system, $N_{PUCCH}^{Start}$ s are the same or different in different uplink subframes.

The above apparatus further comprises the following features: $N_{PUCCH}^{Start}$ s of channel resources of the PUCCH corresponding to the ePDCCH in different transmission modes are the same or different.

The above apparatus further comprises the following features: the channel resource determination unit is configured to determine an offset, wherein, the offset is a fixed value, or is determined according to one of the following information or a combination thereof:

antenna port information of the ePDCCH, indication signaling, a transmission mode of the ePDCCH, a position of the ePDCCH in the physical resource block, an enhanced control channel element index corresponding to the ePDCCH, and an enhanced resource unit group index corresponding to the ePDCCH.

The above apparatus further comprises the following features: the channel resource determination unit is configured to determine the offset according to one of the following steps or a combination thereof:

A) establishing a correspondence between the antenna port information and the offset, determining the offset according to the antenna port information used by the ePDCCH; wherein, the antenna port information used by the ePDCCH includes an antenna port index; or the antenna port information used by the ePDCCH includes an antenna port index and initial sequence information corresponding to the antenna port;

B) establishing a correspondence between the antenna port information and the offset, and determining the offset according to the antenna port information used by the ePDCCH and the indication signaling;

C) determining the offset according to the indication signaling;

D) when the ePDDCH is in a distributed transmission mode, the offset corresponding to the ePDCCH being 0 or determined according to the indication signaling, and when the ePDCCH is in a localized transmission mode, determining an offset corresponding to the ePDCCH according to any of the steps A to C.

The above apparatus further comprises the following features: the resource determination unit is configured to determine the offset according to the antenna port information used by the ePDCCH and indication signaling by means of:

Offset=offset1+ARI, wherein, offset1 is determined according to the antenna port index of the ePDCCH, and the ARI value is configured by the indication signaling.

The above apparatus further comprises the following features: the channel resource determination unit is configured to determine the offset according to a combination of the step B and the step D by means of:

Offset=offset1+ARI, wherein, when the ePDCCH is in a distributed transmission mode, offset1 is 0, and when the ePDCCH is in a localized transmission mode, offset1 is determined according to the antenna port index of the ePDCCH, and the ARI value is configured by the indication signaling.

The above apparatus further comprises the following features: the channel resource determination unit is configured to determine a channel resource index $n_{PUCCH}^{(1)}$ of a PUCCH according to the physical resources of an ePDCCH by means of:

determining $n_{PUCCH}^{(1)}$ according to the following equation:

$$n_{PUCCH}^{(1)} = f(n_{PR}) + \text{offset} + N_{PUCCH}^{Start}$$

wherein, $n_{PR}$ is a renumbered physical resource block index for carrying the ePDCCH, or $n_{PR}$ is an enhanced control channel element index for carrying the ePDCCH; and $N_{PUCCH}^{Start}$ is an initial position of the channel resources of the PUCCH.

The above apparatus further comprises the following features:

when the apparatus transmits all ACKs/NACKs of the PDSCH on M downlink subframes on an uplink subframe n, the channel resource determination unit is configured to determine the channel resource index $n_{PUCCH}^{(1)}$ of the PUCCH according to the physical resources of the ePDCCH by means of:

for a downlink subframe k, the apparatus determining a channel resource index $n_{PUCCH,m}^{(1)}$ of the PUCCH according to a physical resource block index $n_{PR}$ of the ePDCCH on the downlink subframe k:

$$n_{PUCCH,m}^{(1)} = (M-m-1) \times N_x + m \times N_x + f(n_{PR}) + \text{offset} + N_{PUCCH}^{Start};$$

wherein, m is a sequence number of the downlink subframe k where the received PDSCH is located in the M downlink subframes corresponding to the uplink subframe n, and $0 \leq m \leq M-1$; $N_x$ is a predefined parameter, and the selection of x ensures $N_x \leq f(n_{PR}) + \text{offset} \leq N_{x+1}$, $x \in \{0, 1, \Lambda, r-1\}$ and $$N_x = \left\lfloor \frac{N_{ePDCCH}^{Total}}{r} \right\rfloor \times x, \text{ or } N_x = \left\lfloor \frac{N_{ePDCCH}^{Total} \times x}{r} \right\rfloor, \text{ or}$$

$$N_x = \left\lfloor N_{ePDCCH}^{Total} \times \frac{x}{r} \right\rfloor, \text{ or } N_x = \left\lfloor \frac{N_{ePDCCH}^{Total}}{r} \times x \right\rfloor,$$

$N_{ePDCCH}^{Total}$ represents a total number of PUCCHs corresponding to the ePDCCH region of one downlink subframe or is indicated by the signaling; r is greater than or equal to 1; $n_{PR}$ is a renumbered physical resource block index for carrying the ePDCCH, or $n_{PR}$ is an enhanced control channel element index for carrying the ePDCCH; and $N_{PUCCH}^{Start}$ is an initial position of the channel resources of the PUCCH.

The above apparatus further comprises the following features:

when the apparatus transmits all ACKs/NACKs of the PDSCH on M downlink subframes on an uplink subframe n, the channel resource determination unit is configured to determine the channel resource index $n_{PUCCH}^{(1)}$ of the PUCCH according to the physical resources of the ePDCCH by means of:

for a downlink subframe k, the apparatus determining a channel resource index $n_{PUCCH,m}^{(1)}$ of the physical uplink control channel PUCCH according to a physical resource block index $n_{PR}$ of the ePDCCH on the downlink subframe k:

$$n_{PUCCH,m}^{(1)} = \sum_{q=0}^{m} N_{ePDCCH,q}^{Total} + f(n_{PR}) + \text{offset} + N_{PUCCH}^{Start};$$

wherein, m is a sequence number of the downlink subframe k where the received PDSCH is located in the M downlink subframes corresponding to the uplink subframe n, and $0 \leq m \leq M-1$; $N_{ePDCCH,m}^{Total}$ represents a total number of PUCCHs corresponding to the ePDCCH region of the downlink subframe k or is indicated by the signaling; $n_{PR}$ is a renumbered physical resource block index for carrying the ePDCCH, or $n_{PR}$ is an enhanced control channel element index for carrying the ePDCCH; and $N_{PUCCH}^{Start}$ is an initial position of the channel resources of the PUCCH.

The above apparatus further comprises the following features:

when $n_{PR}$ is $n_{PRB}$, and $n_{PRB}$ is a renumbered physical resource block index for carrying the ePDCCH, $$f(n_{PR}) = f(n_{PRB}) = n_{PRB} \times h; n_{PRB} = \left\lfloor \frac{n_{eCCE}}{h} \right\rfloor,$$

$n_{eCCE}$ is an enhanced control channel element index for carrying the ePDCCH;

wherein, h is a maximum number of the uplink control channel resources corresponding to one physical resource block carrying the ePDCCH, or h is a number of enhanced control channel elements included in one physical resource block carrying the ePDCCH, or h is indicated by signaling, or h is a predefined positive integer.

The above apparatus further comprises the following features: the channel resource determination unit is further configured to determine $n_{PRB}$ by means of:

for the ePDCCH in a localized transmission mode, determining that $n_{PRB}$ is a renumbered maximum or minimum physical resource block index for carrying the ePDCCH; or for the ePDCCH in a distributed transmission mode, determining $n_{PRB}$ according to the maximum or minimum D-eCCE index for carrying the ePDCCH; wherein, the D-eCCE is an enhanced control channel element for the ePDCCH in the distributed transmission mode.

The above apparatus further comprises the following features: the channel resource determination unit is further configured to determine $n_{PRB}$ according to the maximum or minimum D-eCCE index for carrying the ePDCCH by means of:

mapping one D-eCCE onto h physical resource blocks, and dividing all numbered D-eCCEs into N groups, wherein, each group includes h D-eCCEs; establishing one-to-one correspondence between h D-eCCEs in one group and the h physical resource blocks, wherein, the h D-eCCEs in the same group correspond to the same antenna port and are mapped onto the same physical resource block, or the h D-eCCEs in the same group are mapped onto the same physical resource block; and determining the physical resource block index $n_{PRB}$ according to a physical resource block index corresponding to a position of the maximum or minimum D-eCCE index for carrying the ePDCCH in the above divided groups;

or when the maximum or minimum D-eCCE index is an odd number, determining that the physical resource block index $n_p$, is a minimum physical resource block index where the maximum or minimum D-eCCE index is located, and when the maximum or minimum D-eCCE index is an even number, determining that the physical resource block index $n_{PRB}$ is a maximum physical resource block index where the maximum or minimum D-eCCE index is located;

or when the maximum or minimum D-eCCE index is an odd number, determining that the physical resource block index $n_{PRB}$ is a maximum physical resource block index where the maximum or minimum D-eCCE index is located, and when the maximum or minimum D-eCCE index is an even number, determining that the physical resource block index $n_{PRB}$ is a minimum physical resource block index where the maximum or minimum D-eCCE index is located.

The above apparatus further comprises the following features:

when $n_{PR}$ is $n_{eCCE}$, and $n_{eCCE}$ is an enhanced control channel element index for carrying the ePDCCH, $$f(n_{PR}) = \left\lfloor \frac{n_{eCCE}}{h} \right\rfloor \text{ or } f(n_{PR}) = n_{eCCE};$$

wherein, h is a maximum number of the uplink control channel resources corresponding to one physical resource block carrying the ePDCCH, or h is a number of enhanced control channel elements included in one physical resource block carrying the ePDCCH, or h is indicated by signaling, or h is a predefined positive integer.

The above apparatus further comprises the following features: the channel resource determination unit is further configured to determine $n_{eCCE}$ by means of:

for the ePDCCH in a localized transmission mode, determining that $n_{eCCE}$ is a maximum or minimum L-eCCE index for carrying the ePDCCH; or determining that $n_{eCCE}$ is a maximum or minimum L-eCCE index for carrying the ePDCCH plus Total-DeCCE; wherein, Total-DeCCE represents a total number of available D-eCCEs or is indicated by signaling; or for the ePDCCH in a distributed transmission mode, determining $n_{eCCE}$ according to the maximum or minimum D-eCCE index for carrying the ePDCCH.

The above apparatus further comprises the following features: the channel resource determination unit is further configured to determine $n_{eCCE}$ according to the maximum or minimum D-eCCE index for carrying the ePDCCH by means of:

determining that $n_{eCCE}$ is a maximum or minimum D-eCCE index for carrying the ePDCCH; or determining that $n_{eCCE}$ is a maximum or minimum D-eCCE index for carrying the ePDCCH plus Total-LeCCE;

wherein, Total-LeCCE represents a total number of available L-eCCEs or is indicated by signaling;

or mapping one D-eCCE onto h L-eCCEs, and dividing all numbered D-eCCEs into N groups, wherein, each group includes h D-eCCEs; establishing one-to-one correspondence between h D-eCCEs in one group and the h L-eCCEs, wherein, the h D-eCCEs in the same group correspond to the same antenna port and are mapped onto the same L-eCCE, or the h D-eCCEs in the same group are mapped onto the same L-eCCE; and determining $n_{eCCE}$ according to an L-eCCE index corresponding to a position of the maximum or minimum D-eCCE index for carrying the ePDCCH in the above divided groups;

or mapping one D-eCCE onto 2 L-eCCEs, when the maximum or minimum D-eCCE index is an odd number, determining that $n_{eCCE}$ is a minimum L-eCCE index where the maximum or minimum D-eCCE index is located, and when the maximum or minimum D-eCCE index is an even number, determining that $n_{eCCE}$ is a maximum L-eCCE index where the maximum or minimum D-eCCE index is located; or when the maximum or minimum D-eCCE index is an odd number, determining that $n_{eCCE}$ is a maximum L-eCCE index where the maximum or minimum D-eCCE index is located, and when the maximum or minimum D-eCCE index is an even number, determining that $n_{eCCE}$ is a minimum L-eCCE index where the maximum or minimum D-eCCE index is located;

wherein, the L-eCCE is an enhanced control channel element for the ePDCCH in the localized transmission mode, and the D-eCCE is an enhanced control channel element for the ePDCCH in the distributed transmission mode.

The above apparatus further comprises the following features: the channel resource determination unit is further configured to number the physical resources of the ePDCCH according to one of the following modes:

numbering all configured physical resources of the ePDCCHs in order;

firstly concatenating physical resources for ePDCCHs in different transmission modes, and then numbering the physical resources of the ePDCCHs in the concatenated order; and numbering the physical resources for the ePDCCHs in different transmission modes respectively.

The above apparatus further comprises the following features: the apparatus is a terminal or a base station.

With the method and apparatus according to the embodiments of the present document, the apparatus is used to determine a channel resource index $n_{PUCCH}^{(1)}$ of the PUCCH, and then determine the resources used by the PUCCH according to the determined channel resource index $n_{PUCCH}^{(1)}$, thereby enabling the feedback information of the PDSCH corresponding to the ePDCCH to be fed back by the PUCCH in the HARQ process corresponding to the ePDCCH, which ensures normal operation of the HARQ process corresponding to the ePDCCH, and ensures the compatibility between an LTE-Advanced system and an LTE Release-8 system.

BRIEF DESCRIPTION OF DRAWINGS

The accompanying drawings described herein are used to provide a better understanding of embodiments of the present document and constitute a part of this application, and the schematic embodiments of the present document and the descriptions thereof are used to explain the technical scheme of the present document and do not constitute an improper definition of technical scheme of the present document. In the accompanying drawings.

PREFERRED EMBODIMENTS OF THE INVENTION

Figure 1:
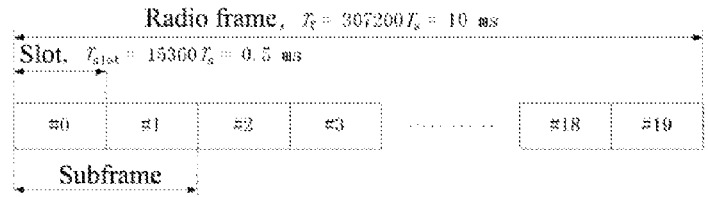
FIG. 1 is a diagram of a frame structure of a FDD mode of an LTE system according to the related technologies.
Figure 2:
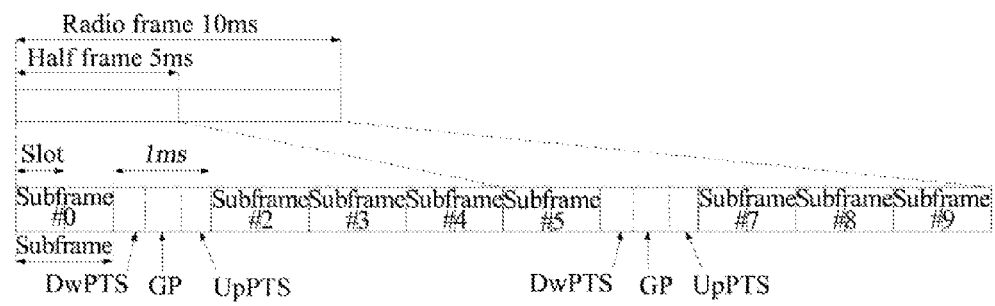
FIG. 2 is a diagram of a frame structure of a TDD mode of an LTE system according to the related technologies.
Figure 3:
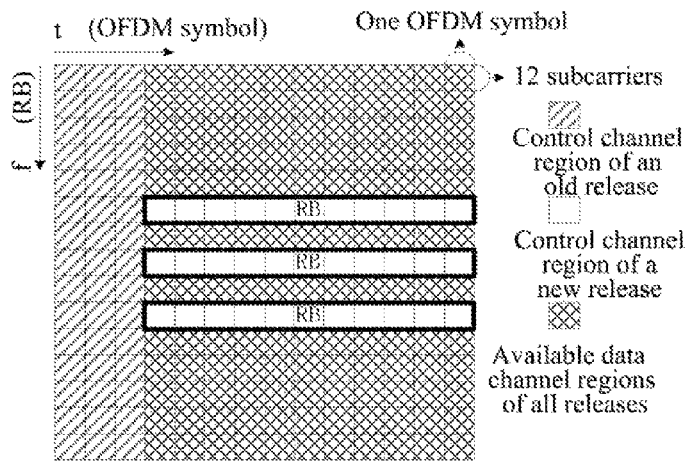
FIG. 3 is a diagram of a control signaling region of new and old releases.

The embodiments of the present document will be described in detail hereinafter with reference to accompanying drawings. It should be illustrated that, in the case of no conflict, the embodiments of this application and the features in the embodiments could be combined randomly with each other.

In the 3GPP, an ePDCCH is introduced to enhance the performance of the PDCCH, and at the same time, a new PDCCH transmission region is introduced. A method for obtaining channel resources of the PUCCH for transmitting the ACK/NACK corresponding to the PDSCH of the ePDCCH is provided in the present embodiment. The method ensures normal operation of the HARQ process corresponding to the ePDCCH, and ensures the compatibility between an LTE-Advanced system and an LTE Release-8 system, thereby enabling an LTE-Advanced terminal to obtain a maximum frequency selectivity gain. It should be illustrated that systems in which the following embodiments and preferred implementations thereof are applied are not limited to the LTE-Advanced system.

The embodiments of the present document provide a method for determining resources in a PUCCH, comprising:

an apparatus determining a channel resource index $n_{PUCCH}^{(1)}$ of the PUCCH according to physical resources of an ePDCCH, wherein, the PUCCH is used for carrying positive acknowledgement/negative acknowledgement (ACK/NACK) information about a PDSCH indicated by the ePDCCH; and the physical resources of the ePDCCH comprise: any one or more of a physical resource block, an eCCE and an antenna port index.

Wherein, the apparatus is a terminal or a base station.

Alternatively, the following application scenarios are primarily included.

1) A region of the ePDCCH in a distributed transmission mode and a region of the ePDCCH in a localized transmission mode are the same; i.e., physical resources for transmitting the ePDCCH in a distributed transmission mode and physical resources for transmitting the ePDCCH in a localized transmission mode share the same region;

2) The region of the ePDCCH in a distributed transmission mode and the region of the ePDCCH in a localized transmission mode are configured independently, i.e., the physical resources for transmitting the ePDCCH in a distributed transmission mode and the physical resources for transmitting the ePDCCH in a localized transmission mode are configured independently.

Alternatively, the step of an apparatus determining a channel resource index $n_{PUCCH}^{(1)}$ of the PUCCH according to physical resources of an ePDCCH comprises: determining an initial position $N_{PUCCH}^{Start}$ of channel resources of the PUCCH, wherein, the $N_{PUCCH}^{Start}$ is an initial position $N_{PUCCH}^{(1)}$ of channel resources of a PUCCH corresponding to an existing PDCCH;

or the $N_{PUCCH}^{Start}$ is the initial position $N_{PUCCH}^{(1)}$ of the channel resources of the PUCCH corresponding to the existing PDCCH plus a predefined D, wherein, the D represents the maximum number of channel resources of the PUCCH corresponding to the PDCCH; or the D represents the number of Control Channel Elements (CCEs) in the subframe where the ePDCCH is located;

or, the $N_{PUCCH}^{Start}$ is the initial position $N_{PUCCH}^{(1)}$ of the channel resources of the PUCCH corresponding to the existing PDCCH plus the predefined D plus V, wherein, the V is determined by signaling;

or the initial position $N_{PUCCH}^{Start}$ is $N_{PUCCH}^{(4)}$, which is determined by signaling;

or the initial position $N_{PUCCH}^{Start}$ is an initial position of PUCCH format 1a/1b resources in the uplink subframe where the PUCCH is located.

Of course, the initial position $N_{PUCCH}^{Start}$ may also be 0, wherein, when multiple serving cells are configured, the above D represents a condition of a primary serving cell (or a primary component carrier) when the ePDCCH is in the primary serving cell; the initial position of the PUCCH Format 1a/1b resource is an initial position of the PUCCH Format 1a/1b resource on the primary serving cell in the uplink subframe where the PUCCH is located.

Alternatively, for a TDD system, $N_{PUCCH}^{Start}$ s may be different or the same in different uplink subframes.

Alternatively, the initial positions of channel resources of the PUCCH corresponding to the ePDCCH in different transmission modes are the same or different, or the initial positions may also be independently configured. For example, the initial position in a distributed transmission mode is $N_{PUCCH}^{(4)}$, and the initial position in a localized transmission mode is $N_{PUCCH}^{(5)}$.

Alternatively, the step of an apparatus determining a channel resource index $n_{PUCCH}^{(1)}$ of the PUCCH according to physical resources of an ePDCCH comprises: determining an offset, wherein, the offset is determined according to any one or more of the following information:

antenna port information of the ePDCCH, indication signaling, a transmission mode of the ePDCCH, a position of the ePDCCH in the physical resource block, an eCCE index corresponding to the ePDCCH, and an enhanced resource unit group index corresponding to the ePDCCH; or the offset is a fixed value, for example, 0 or other values except 0.

Wherein, when the offset is fixed to 0, it is equivalent to inexistence of the parameter.

Alternatively, a method for determining the offset is one of the following or a combination thereof.

Method One a correspondence is established between the antenna port information and the offset value, the offset is determined according to the antenna port information used by the ePDCCH, and a range of the offset value is from 0 to h−1; wherein, the antenna port information used by the ePDCCH includes an antenna port index;

Method Two a correspondence is established between the antenna port information and the offset value, the offset is determined according to the antenna port information used by the ePDCCH, and a range of the offset value is from 0 to h−1; wherein, the antenna port information used by the ePDCCH includes an antenna port index and initial sequence information corresponding to the antenna port, and the initial sequence information corresponding to the antenna port includes a Scrambling Code Identifier (SSCID) and/or a virtual cell ID;

Method Three a correspondence is established between the antenna port information and the offset value, and the offset is determined according to the antenna port information used by the ePDCCH and indication signaling;

the indication signaling includes higher-layer signaling or user dedicated parameters (for example, a Cell Radio Network Temporary Identifier (C-RNTI)) etc.;

the correspondence between the antenna port information and the offset value is configured by higher-layer signaling or determined according to the user dedicated parameters.

Method Four

The offset is determined according to the indication signaling (for example, the Allocation Resource Indicator (ARI)).

Method Five when the ePDDCH is in a distributed transmission mode, the offset corresponding to the ePDCCH is 0 or determined according to the indication signaling, and when the ePDCCH is in a localized transmission mode, an offset corresponding to the ePDCCH is determined according to any of the above methods.

The above methods may further have the following features: in the method three, that the offset is determined according to the antenna port information used by the ePDCCH and indication signaling comprises:

Offset=offset1+ARI, wherein, offset1 is determined according to the antenna port index of the ePDCCH, and the ARI value is configured by the indication signaling.

The above methods may further have the following features: determining the offset according to a combination of the method three and the method five comprises:

Offset=offset1+ARI, wherein, when the ePDCCH is in a distributed transmission mode, offset1 is 0, and when the ePDCCH is in a localized transmission mode, offset1 is determined according to the antenna port index of the ePDCCH, and the ARI value is configured by the indication signaling.

Alternatively, the step of an apparatus determining a channel resource index $n_{PUCCH}^{(1)}$ of the PUCCH according to physical resources of an ePDCCH comprises:

the apparatus determining the $n_{PUCCH}^{(1)}$ according to the following equation:

$$n_{PUCCH}^{(1)} = f(n_{PR}) + \text{offset} + N_{PUCCH}^{Start};$$

wherein, the $n_{PR}$ is a renumbered physical resource block index for carrying the ePDCCH, or the $n_{PR}$ is an enhanced control channel element index for carrying the ePDCCH.

The $n_{PR}$ may be $n_{PRB}$, and the $n_{PRB}$ is a renumbered physical resource block index for carrying the ePDCCH, or $n_{PR}$ is an eCCE index for carrying the ePDCCH; and when the $n_{PR}$ is $n_{PRB}$, the $n_{PUCCH}^{(1)} = f(n_{PRB}) + \text{offset} + N_{PUCCH}^{Start}$, the $f(n_{PR}) = f(n_{PRB}) = n_{PRB} \times h$;

the $$n_{PRB} = \left\lfloor \frac{n_{eCCE}}{h} \right\rfloor,$$

the $n_{eCCE}$ is an enhanced control channel element index carrying the ePDCCH;

wherein, h is the maximum number of the uplink control channel resources corresponding to one physical resource block carrying the ePDCCH, or h is the number of eCCEs included in one physical resource block carrying the ePDCCH, or h is indicated by signaling, or h is a predefined positive integer.

Wherein, the $n_{PRB}$ is determined by means of:

for the ePDCCH in a localized transmission mode, determining that the $n_{PRB}$ is a renumbered maximum or minimum physical resource block index for carrying the ePDCCH; or for the ePDCCH in a distributed transmission mode, determining the $n_{PRB}$ according to the maximum or minimum D-eCCE index for carrying the ePDCCH; wherein, the D-eCCE is an eCCE for the ePDCCH in the distributed transmission mode.

The step of determining the $n_{PRB}$ according to the maximum or minimum D-eCCE index for carrying the ePDCCH comprises:

mapping one D-eCCE onto h physical resource blocks, and dividing all numbered D-eCCEs into N groups, wherein, each group includes h D-eCCEs; establishing one-to-one correspondence between h D-eCCEs in one group and the h physical resource blocks, wherein, the h D-eCCEs in the same group correspond to the same antenna port and are mapped onto the same physical resource block, or the h D-eCCEs in the same group are mapped onto the same physical resource block; and determining the physical resource block index $n_{PRB}$ according to a physical resource block index corresponding to a position of the maximum or minimum D-eCCE index for carrying the ePDCCH in the above divided groups;

or when the maximum or minimum D-eCCE index is an odd number, determining that the physical resource block index $n_{PRB}$ is a minimum physical resource block index where the maximum or minimum D-eCCE index is located, and when the maximum or minimum D-eCCE index is an even number, determining that the physical resource block index $n_{PRB}$ is a maximum physical resource block index where the maximum or minimum D-eCCE index is located;

or when the maximum or minimum D-eCCE index is an odd number, determining that the physical resource block index $n_{PRB}$ is a maximum physical resource block index where the maximum or minimum D-eCCE index is located, and when the maximum or minimum D-eCCE index is an even number, determining that the physical resource block index $n_{PRB}$ is a minimum physical resource block index where the maximum or minimum D-eCCE index is located.

Alternatively, the $n_{PR}$ may be $n_{eCCE}$, which is an enhanced control channel element index for carrying the ePDCCH, $f(n_{PR})=f(n_{eCCE})$, and when the $n_{PR}$ is $n_{eCCE}$, the $$f(n_{eCCE}) = \left\lfloor \frac{n_{eCCE}}{h} \right\rfloor$$

or $f(n_{eCCE})=n_{eCCE}$;

Wherein, the $n_{eCCE}$ is determined by means of:

for the ePDCCH in a localized transmission mode, determining that the $n_{eCCE}$ is a maximum or minimum L-eCCE index for carrying the ePDCCH; or determining that the $n_{eCCE}$ is a maximum or minimum L-eCCE index for carrying the ePDCCH plus Total-DeCCE; wherein, the Total-DeCCE represents the total number of available D-eCCEs or is indicated by signaling; or for the ePDCCH in a distributed transmission mode, determining the $n_{eCCE}$ according to the maximum or minimum D-eCCE index for carrying the ePDCCH.

Wherein, the step of determining the $n_{eCCE}$ according to the maximum or minimum D-eCCE index for carrying the ePDCCH comprises:

determining that the $n_{eCCE}$ is a maximum or minimum D-eCCE index for carrying the ePDCCH; or determining that the $n_{eCCE}$ is a maximum or minimum D-eCCE index for carrying the ePDCCH plus Total-LeCCE; wherein, the Total-DeCCE represents the total number of available L-eCCEs or is indicated by signaling;

or mapping one D-eCCE onto h L-eCCEs, and dividing all numbered D-eCCEs into N groups, wherein, each group includes h D-eCCEs; establishing one-to-one correspondence between h D-eCCEs in one group and the h L-eCCEs, wherein, the h D-eCCEs in the same group correspond to the same antenna port and are mapped onto the same L-eCCE, or the h D-eCCEs in the same group are mapped onto the same L-eCCE; and determining the $n_{eCCE}$ according to an L-eCCE index corresponding to a position of the maximum or minimum D-eCCE index in the above divided groups;

or mapping one D-eCCE onto 2 L-eCCEs, when the maximum or minimum D-eCCE index is an odd number, determining that the $n_{eCCE}$ is a minimum L-eCCE index where the maximum or minimum D-eCCE index is located, and when the maximum or minimum D-eCCE index is an even number, determining that the $n_{eCCE}$ is a maximum L-eCCE index where the maximum or minimum D-eCCE index is located; or when the maximum or minimum D-eCCE index is an odd number, determining that the $n_{eCCE}$ is a maximum L-eCCE index where the maximum or minimum D-eCCE index is located, and when the maximum or minimum D-eCCE index is an even number, determining that the $n_{eCCE}$ is a minimum L-eCCE index where the maximum or minimum D-eCCE index is located;

wherein, the L-eCCE is an eCCE for the ePDCCH in the localized transmission mode, and the D-eCCE is an eCCE for the ePDCCH in the distributed transmission mode.

Alternatively, for a TDD system,

Mode One

When an apparatus transmits all ACKs/NACKs of the PDSCH on M downlink subframes k on an uplink subframe n, the step of the apparatus determining a channel resource index $n_{PUCCH}^{(1)}$ of the PUCCH according to the physical resources of the ePDCCH comprises:

for a downlink subframe k, the apparatus determining a channel resource index $n_{PUCCH,m}^{(1)}$ of the PUCCH according to a physical resource index $n_{PR}$ of the ePDCCH on the downlink subframe k:

$$n_{PUCCH,m}^{(1)} = (M-m-1) \times N_x + m \times N + f(n_{PR}) + \text{offset} + N_{PUCCH}^{Start};$$

wherein, m is a sequence number of the downlink subframe k where the received PDSCH is located in the M downlink subframes corresponding to the uplink subframe n, and $0 \leq m \leq M-1$; $N_x$ is a predefined parameter, and the selection of x ensures $$N_x \leq f(n_{PR}) + \text{offset} \leq N_{x+1}, x \in \{0, 1, \Lambda, r-1\} \text{ and}$$

-continued $$N_x = \left\lfloor \frac{N_{ePDCCH}^{Total}}{r} \right\rfloor \times x, \text{ or } N_x = \left\lfloor \frac{N_{ePDCCH}^{Total} \times x}{r} \right\rfloor, \text{ or}$$

$$N_x = \left\lfloor N_{ePDCCH}^{Total} \times \frac{x}{r} \right\rfloor, \text{ or } N_x = \left\lfloor \frac{N_{ePDCCH}^{Total}}{r} \times x \right\rfloor,$$

$N_{ePDCCH}^{Total}$ represents the total number of PUCCHs corresponding to the ePDCCH region of one downlink subframe or is indicated by the signaling; r is greater than or equal to 1, and a preferred value thereof is 2, 3 or 4.

Alternatively, for a TDD system,

Mode Two when the apparatus transmits all ACKs/NACKs of the PDSCH on M downlink subframes k on an uplink subframe n, the step of the apparatus determining the channel resource index $n_{PUCCH}^{(1)}$ of the PUCCH according to the physical resources of the ePDCCH comprises:

for a downlink subframe k, the apparatus determining a channel resource index $n_{PUCCH,m}^{(1)}$ of the PUCCH according to a physical resource index $n_{PR}$ of the ePDCCH on the subframe k:

$$n_{PUCCH,m}^{(1)} = \sum_{q=0}^{m} N_{ePDCCH,q}^{Total} + f(n_{PR}) + \text{offset} + N_{PUCCH}^{Start};$$

wherein, m is a sequence number of the downlink subframe k where the received PDSCH is located in the M downlink subframes corresponding to the uplink subframe n, and $0 \leq m \leq M-1$; $N_{ePDCCH,m}^{Total}$ represents the total number of PUCCHs corresponding to the ePDCCH region of the downlink subframe k or is indicated by the signaling.

Alternatively, the method for numbering the physical resources of the ePDCCH comprises:

Method one: numbering all configured physical resources of the ePDCCHs in order;

Method two: firstly concatenating physical resources for ePDCCHs in different transmission modes, and then renumbering the physical resources of the ePDCCHs in the concatenated order; and Method three: renumbering the physical resources for the ePDCCHs in different transmission modes respectively.

Wherein, numbers of the above physical resources are those on a subframe where the ePDCCH is located. When multiple serving cells are configured, the numbers of the physical resources are those on a serving cell and a subframe where the ePDCCH is located, wherein, the ePDCCH is located in a primary serving cell.

The technical scheme of the present document will be further described below by specific embodiments.

Embodiment One

When physical resource blocks of an ePDCCH are renumbered, an apparatus determines a channel resource index $n_{PUCCH}^{(1)}$ of a PUCCH according to the renumbered physical resource block index $n_{PRB}$ where the ePDCCH is located and an offset, wherein, the maximum number of the uplink control channel resources corresponding to one physical resource block carrying the ePDCCH is h, $n_{PRB}$ and the offset are determined according to at least one of antenna port information used by the ePDCCH, a transmission mode of the ePDCCH, a position of the ePDCCH in the physical resource blocks, and indication signaling; and the PUCCH is used to carry ACK/NACK information of the PDSCH indicated by the ePDCCH.

Before the apparatus determines the channel resource index $n_{PUCCH}^{(1)}$ in an implicit mapping mode, the step of the apparatus determining a channel resource index $n_{PUCCH}^{(1)}$ of a PUCCH according to the physical resources of an ePDCCH comprises: the apparatus determining an initial position $N_{PUCCH}^{Start}$ of channel resources of the PUCCH, wherein, the $N_{PUCCH}^{Start}$ is an initial position $N_{PUCCH}^{(1)}$ of the channel resources of the PUCCH corresponding to an existing PDCCH; or the $N_{PUCCH}^{Start}$ is an initial position $N_{PUCCH}^{(1)}$ of the channel resource of the PUCCH corresponding to the existing PDCCH plus a predefined value D, wherein, the D represents the maximum number of channel resources of the PUCCH corresponding to the PDCCH in uplink subframes where the PUCCH is located; or the D represents the number of CCEs in subframes where the ePDCCH is located; or the $N_{PUCCH}^{Start}$ is the initial position $N_{PUCCH}^{(1)}$ of the channel resources of the PUCCH corresponding to the existing PDCCH plus the predefined value D plus V, wherein, the V is determined by signaling; or the $N_{PUCCH}^{Start}$ is determined by signaling; or the $N_{PUCCH}^{Start}$ is an initial position of PUCCH format 1a/1b resources in uplink subframes where the PUCCH is located.

For a TDD system, the initial positions may be different or the same in different uplink subframes;

the initial positions in different transmission modes may be the same or different (i.e., the initial positions are independently configured, for example, an initial position in the distributed transmission mode is $N_{PUCCH}^{(4)}$, and an initial position in a localized transmission mode is $N_{PUCCH}^{(5)}$).

The $n_{PRB}$ is determined according to the transmission mode of the ePDCCH; wherein, the transmission mode of the ePDCCH comprises a distributed transmission mode and a localized transmission mode;

the distributed transmission mode includes transmitting the ePDCCH on distributed physical resource block indexes, and the localized transmission mode includes transmitting the ePDCCH on localized (renumbered) physical resource block indexes;

an enhanced Control Channel Element (eCCE) of the ePDCCH used for a localized transmission mode is referred to as an L-eCCE, and an enhanced Control Channel Element (eCCE) of the ePDCCH used for a distributed transmission mode is referred to as a D-eCCE; the L-eCCE is a resource in one physical resource block, and the D-eCCE is a resource in multiple physical resource blocks.

A method for renumbering the physical resource blocks of the ePDCCH includes the following modes.

Mode 1a

Physical resource blocks for transmitting the ePDCCH in a distributed transmission mode and physical resource blocks for transmitting the ePDCCH in a localized transmission mode share the same region; i.e., the configured physical resource blocks for transmitting the ePDCCH may be used to transmit the ePDCCH in a distributed transmission mode, and may also be used to transmit the ePDCCH in a localized transmission mode. At this time, the method for renumbering the physical resource blocks of the ePDCCH is to renumber the indexes of the configured physical resource blocks for transmitting the ePDCCH according to the sizes of the original physical resource block indexes.

Mode 1b

The physical resource blocks for transmitting the ePDCCH in a distributed transmission mode and the physical resource blocks for transmitting the ePDCCH in a localized transmission mode are configured respectively, and correspond to different regions. At this time, the method for renumbering the physical resource blocks of the ePDCCH is to renumber the indexes of the configured physical resource blocks for transmitting the ePDCCH according to the sizes of the original physical resource block indexes.

Mode 2

The physical resource blocks for transmitting the ePDCCH in a distributed transmission mode and the physical resource blocks for transmitting the ePDCCH in a localized transmission mode are configured respectively, and correspond to different regions. At this time, the method for renumbering the physical resource blocks of the ePDCCH is to firstly concatenate the physical resource blocks for transmitting the ePDCCH in a distributed transmission mode and the physical resource blocks for transmitting the ePDCCH in a localized transmission mode, and then renumber the physical resource blocks according to a concatenated order.

Mode 3

The physical resource blocks for transmitting the ePDCCH in a distributed transmission mode and the physical resource blocks for transmitting the ePDCCH in a localized transmission mode are configured respectively, and correspond to different regions. At this time, the method for renumbering the physical resource blocks of the ePDCCH is to respectively renumber physical resource blocks for transmitting the ePDCCH in a distributed transmission mode and the physical resource blocks for transmitting the ePDCCH in a localized transmission mode in order.

For the ePDCCH in a localized transmission mode, the physical resource block index $n_{PRB}$ is a renumbered maximum (or minimum) physical resource block index corresponding to the ePDCCH; and the method for renumbering the physical resource block indexes of the ePDCCH is to renumber the indexes of the configured physical resource blocks for transmitting the ePDCCH according to the sizes of the original physical resource block indexes.

For the ePDCCH in a distributed transmission mode, determining the physical resource block index $n_{PRB}$ according to the maximum (or minimum) D-eCCE index corresponding to the ePDCCH comprises the following methods.

Determination Method One one D-eCCE is mapped onto h physical resource blocks, and all numbered D-eCCEs are divided into N groups, wherein, each group includes h D-eCCEs; one to one correspondence is established between h D-eCCEs in one group and the h physical resource blocks, wherein, the h D-eCCEs correspond to the same antenna port and are mapped onto the same physical resource block, or the h D-eCCEs are mapped onto the same physical resource block; and the physical resource block index $n_{PRB}$ is determined according to a physical resource block index corresponding to a position of the D-eCCE index in the above divided groups.

Determination Method Two when the D-eCCE index is an odd number, the physical resource block index $n_{PRB}$ is a minimum physical resource block index where the D-eCCE index is located, and when the D-eCCE index is an even number, the physical resource block index $n_{PRB}$ is a maximum physical resource block index where the D-eCCE index is located; or when the D-eCCE index is an odd number, the physical resource block index $n_{PRB}$ is a maximum physical resource block index where the D-eCCE index is located, and when the D-eCCE index is an even number, the physical resource block index $n_{PRB}$ is a minimum physical resource block index where the D-eCCE index is located.

Specific Application One

Assuming that there are 100 physical resource blocks available in a system, with corresponding numbers from #0 to #99, physical resource block indexes for transmitting an ePDCCH are #4, #5, #12, #13, #20, #21, #28 and #29, i.e., being able to transmit not only an ePDCCH in a localized transmission mode but also an ePDCCH in a distributed transmission mode, then renumbered indexes corresponding to the physical resource blocks #4, #5, #12, #13, #20, #21, #28 and #29 are N0, N1, N2, N3, N4, N5, N6 and N7;

the physical resource block indexes where the ePDCCH of the apparatus is located are #20 and #21, the transmission mode of the ePDCCH is a localized transmission mode, and numbers corresponding to the physical resource indexes #20 and #21 are N4 and N5. When the physical resource block index $n_{PRB}$ is a renumbered maximum physical resource block index corresponding to the ePDCCH, $n_{PRB}$ is N5; and when the physical resource block index $n_{PRB}$ is a renumbered minimum physical resource block index corresponding to the ePDCCH, $n_{PRB}$ is N4;

when one D-eCCE is mapped onto two physical resource blocks, the two physical resource blocks correspond to 8 D-eCCEs, wherein, numbers of the D-eCCEs corresponding to the physical resource block indexes #4 and #12 are 0 to 7, numbers of the D-eCCEs corresponding to the physical resource block indexes #5 and #13 are 8 to 15, numbers of the D-eCCEs corresponding to the physical resource block indexes #20 and #28 are 16 to 23, and numbers of the D-eCCEs corresponding to the physical resource block indexes #21 and #29 are 24 to 31; it is determined according to the minimum D-eCCE index corresponding to the ePDCCH that when the D-eCCE index is an odd number, the physical resource block index $n_{PRB}$ is a maximum physical resource block index where the D-eCCE is located, and when the D-eCCE index is an even number, the physical resource block index $n_{PRB}$ is a minimum physical resource block index where the D-eCCE index is located; and when the transmission mode of the ePDCCH is a distributed transmission mode and the D-eCCE indexes where the ePDCCH of the apparatus is located are #2 and #3, the minimum D-eCCE index where the ePDCCH is located is #2, the D-eCCE index #2 is an even number, and the physical resource block index $n_{PRB}$ is a renumbered index N0 corresponding to the minimum physical resource block index #4 where the D-eCCE index is located.

Specific Application Two

Assuming that there are 100 physical resource blocks available in a system, with corresponding numbers from #0 to #99, physical resource block indexes for transmitting an ePDCCH are #4, #8, #12, #16, #20, #24, #28 and #32, wherein, physical resource block indexes #4, #12, #20 and #28 are used to transmit an ePDCCH in a localized transmission mode, and physical resource block indexes #8, #16, #24 and #32 are used to transmit an ePDCCH in a distributed transmission mode, then renumbered indexes corresponding to the physical resource blocks #4, #8, #12, #16, #20, #24, #28 and #32 are N0, N1, N2, N3, N4, N5, N6 and N7;

when the physical resource block index where the ePDCCH of the apparatus is located is #4, a number corresponding to the physical resource block index #4 is N0, and the physical resource block index $n_{PRB}$ is N0;

when one D-eCCE is mapped onto two physical resource blocks, the two physical resource blocks correspond to 4 D-eCCEs, wherein, numbers of the D-eCCEs corresponding to the physical resource block indexes #8 and #24 are 0 to 3, numbers of the D-eCCEs corresponding to the physical resource block indexes #16 and #32 are 4 to 7; it is determined according to the minimum D-eCCE index corresponding to the ePDCCH that when the D-eCCE index is an even number, the physical resource block index $n_{PRB}$ is a maximum physical resource block index where the D-eCCE is located, and when the D-eCCE index is an odd number, the physical resource block index $n_{PRB}$ is a minimum physical resource block index where the D-eCCE index is located; and when the transmission mode of the ePDCCH is a distributed transmission mode and the D-eCCE index where the ePDCCH of the apparatus is located is #7, the minimum D-eCCE index where the ePDCCH is located is #7, the D-eCCE index #7 is an odd number, and the physical resource block index $n_{PRB}$ is a renumbered index N3 corresponding to the minimum physical resource block index #16 where the D-eCCE index is located.

Specific Application Three

Assuming that there are 50 physical resource blocks available in a system, with corresponding numbers from #0 to #49, physical resource block indexes for transmitting an ePDCCH are #4, #8, #12, #16, #20, #24, #28 and #32, wherein, physical resource block indexes #4, #12, #20 and #28 are used to transmit an ePDCCH in a localized transmission mode, and physical resource block indexes #8, #16, #24 and #32 are used to transmit an ePDCCH in a distributed transmission mode, then the physical resource blocks for transmitting the ePDCCH in a distributed transmission mode and the physical resource blocks for transmitting the ePDCCH in a localized transmission mode are concatenated as physical resource block indexes #4, #12, #20, #28, #8, #16, #24 and #32, and are then renumbered as N0, N1, N2, N3, N4, N5, N6 and N7 in a concatenated order;

when the physical resource block indexes where the ePDCCH of the apparatus is located are #4 and #12, numbers corresponding to the physical resource block indexes #4 and #12 are N0 and N1. When the physical resource block index $n_{PRB}$ is a renumbered maximum physical resource block index corresponding to the ePDCCH, $n_{PRB}$ is N1; and when the physical resource block index $n_{PRB}$ is a renumbered minimum physical resource block index corresponding to the ePDCCH, $n_{PRB}$ is N0;

when one D-eCCE is mapped onto four physical resource blocks, the four physical resource blocks correspond to 16 D-eCCEs, wherein, numbers of the D-eCCEs corresponding to the physical resource block indexes #8, #16, #24 and #32 are 0 to 15. The numbered D-eCCEs are divided into 4 groups, each group including 4 D-eCCEs, and one-to-one correspondence is established between 4 D-eCCEs in one group and the 4 physical resource blocks; wherein, the 4 D-eCCEs in the group correspond to the same antenna port and are mapped onto the same physical resource block, or the 4 D-eCCEs in the group are mapped onto the same physical resource block to be divided in order; a physical resource block corresponding to the D-eCCE index Y is a $\{(Y \bmod h)+1\}^{th}$ physical resource block in the 4 physical resource blocks, wherein, h is 4; when the transmission mode of the ePDCCH is a distributed transmission mode and a D-eCCE index where the ePDCCH of the apparatus is located is #9, the physical resource block corresponding to the D-eCCE index #9 is a $(\{(8 \bmod 4)+1\}=2)^{th}$ physical resource block in the 4 physical resource blocks, and the physical resource block index $n_{PRB}$ is a renumbered index N5 corresponding to the physical resource block index #16;

Specific Application Four

Assuming that there are 50 physical resource blocks available in a system, with corresponding numbers from #0 to #49, physical resource block indexes for transmitting an ePDCCH are #4, #8, #12, #16, #20, #24, #28 and #32, wherein, physical resource block indexes #4, #12, #20 and #28 are used to transmit an ePDCCH in a localized transmission mode, and physical resource block indexes #8, #16, #24 and #32 are used to transmit an ePDCCH in a distributed transmission mode, then the physical resource blocks for transmitting the ePDCCH in a distributed transmission mode and the physical resource blocks for transmitting the ePDCCH in a localized transmission mode are renumbered respectively in a concatenated order, the renumbered indexes corresponding to the physical resource block indexes #4, #12, #20 and #28 for transmitting the ePDCCH in a localized transmission mode are N0, N1, N2 and N3, and the renumbered indexes corresponding to the physical resource block indexes #8, #16, #24 and #32 for transmitting the ePDCCH in a distributed transmission mode are N0, N1, N2 and N3;

when the physical resource index where the ePDCCH of the apparatus is located is #12, as a number corresponding to the physical resource index #12 is N1, the physical resource block index $n_{PRB}$ is N1;

when one D-eCCE is mapped onto four physical resource blocks, the four physical resource blocks correspond to 8 D-eCCEs, wherein, numbers of the D-eCCEs corresponding to the physical resource block indexes #8, #16, #24 and #32 are 0 to 7. The numbered D-eCCEs are divided into 2 groups, each group including 4 D-eCCEs, and one-to-one correspondence is established between 4 D-eCCEs in one group and the 4 physical resource blocks; wherein, the 4 D-eCCEs in the group correspond to the same antenna port and are mapped onto the same physical resource block, or the 4 D-eCCEs in the group are mapped onto the same physical resource block to be divided in order; a physical resource block corresponding to the D-eCCE index Y is a $\{(Y \bmod h)+1\}^{th}$ physical resource block in the 4 physical resource blocks, wherein, h is 4; when the transmission mode of the ePDCCH is a distributed transmission mode and a D-eCCE index where the ePDCCH of the apparatus is located is #6, the physical resource block corresponding to the D-eCCE index #6 is a $(\{(6 \bmod 4)+1\}=3)^{th}$ physical resource block in the 4 physical resource blocks, and the physical resource block index $n^{PRB}$ is a renumbered index N2 corresponding to the physical resource block index #24;

The method for determining the offset is described as follows.

Method One

One-to-one correspondence is established between the antenna port information and the offset value, and the offset value is determined according to the antenna port information used by the ePDCCH; and a range of the offset value is 0 to h−1; wherein, the antenna port information used by the ePDCCH includes antenna port indexes.

Scenario One

Assuming that the antenna port indexes of the ePDCCH are antenna port 7, antenna port 8, antenna port 9 and antenna port 10, and a value of h is 4, then the antenna port 7, antenna port 8, antenna port 9 and antenna port 10 correspond to offset values 0 to 3 one by one.

For example, an offset value corresponding to the antenna port 7 is 0, an offset value corresponding to the antenna port 8 is 1, an offset value corresponding to the antenna port 9 is 2, and an offset value corresponding to the antenna port 10 is 3, and the correspondence is not limited thereto; and the correspondence for different users may be the same or different.

Scenario Two

Assuming that the antenna port indexes of the ePDCCH are antenna port 7 and antenna port 9, and a value of h is 4, then the antenna port 7 and antenna port 9 correspond to offset values 0 to 3.

For example, an offset value corresponding to the antenna port 7 is 0, and an offset value corresponding to the antenna port 9 is 2, or an offset value corresponding to the antenna port 7 is 1, and an offset value corresponding to the antenna port 9 is 3, and the correspondence is not limited thereto.

Scenario Three

Assuming that the antenna port indexes of the ePDCCH are antenna port 7 and antenna port 8, and a value of h is 2, then the antenna port 7 and antenna port 8 correspond to offset values 0 to 1.

For example, an offset value corresponding to the antenna port 7 is 0, and an offset value corresponding to the antenna port 8 is 1, and the correspondence is not limited thereto.

Method Two

One-to-one correspondence is established between the antenna port information and the offset value, and the offset value is determined according to the antenna port information used by the ePDCCH; and a range of the offset value is 0 to h−1; wherein, the antenna port information used by the ePDCCH includes antenna port indexes and initial sequence information corresponding to the antenna ports (an SCID and/or a virtual cell ID).

Scenario One

Assuming that the antenna port indexes of the ePDCCH are antenna port 7, antenna port 8, antenna port 9 and antenna port 10, and a value of h is 8, a value of the SCID is 0 or 1, and the virtual cell ID is x(0) or x(1), then the antenna port 7/8/9/10 with an SCID of 0 and the antenna port 7/8/9/10 with an SCID of 1 correspond to offset values 0 to 7 one by one; or the antenna port 7/8/9/10 with a virtual cell ID of x(0) and the antenna port 7/8/9/10 with a virtual cell ID of x(1) correspond to offset values 0 to 7 one by one; or the antenna port 7/8/9/10 with an SCID of 0 and a virtual cell ID of x(0) and the antenna port 7/8/9/10 with an SCID of 1 and a virtual cell ID of x(1) correspond to offset values 0 to 7 one by one.

For example, when the virtual cell ID is x(0), an offset value corresponding to the antenna port 7 is 0, an offset value corresponding to the antenna port 8 is 1, an offset value corresponding to the antenna port 9 is 2, and an offset value corresponding to the antenna port 10 is 3; and when the virtual cell ID is x(1), an offset value corresponding to the antenna port 7 is 4, an offset value corresponding to the antenna port 8 is 5, an offset value corresponding to the antenna port 9 is 6, and an offset value corresponding to the antenna port 10 is 7, and the correspondence is not limited thereto; and the correspondence for different users may be the same or different.

Scenario Two

Assuming that the antenna port indexes of the ePDCCH are antenna port 7 and antenna port 8, and a value of h is 4, a value of the SCID is 0 or 1, and the virtual cell ID is x(0) or x(1), then the antenna port 7/8 with an SCID of 0 and the antenna port 7/8 with an SCID of 1 correspond to offset values 0 to 3 one by one; or the antenna port 7/8 with a virtual cell ID of x(0) and the antenna port 7/8 with a virtual cell ID of x(1) correspond to offset values 0 to 3 one by one; or the antenna port 7/8 with an SCID of 0 and a virtual cell ID of x(0) and the antenna port 7/8 with an SCID of 1 and a virtual cell ID of x(1) correspond to the offset values 0 to 3 one by one.

For example, when the virtual cell ID is x(0), an offset value corresponding to the antenna port 7 is 0, and an offset value corresponding to the antenna port 8 is 1; and when the virtual cell ID is x(1), an offset value corresponding to the antenna port 7 is 2, and an offset value corresponding to the antenna port 8 is 3, and the correspondence is not limited thereto; and the correspondence for different users may be the same or different.

Method Three

One-to-one correspondence is established between the antenna port information and the offset value, and the offset value is determined according to the antenna port information used by the ePDCCH and indication signaling;

the indication signaling includes higher-layer signaling or user dedicated parameters (for example a C-RNTI) etc.;

One-to-one correspondence between the antenna port information and the offset value is configured by higher-layer signaling or is determined according to the user dedicated parameters.

Scenario One

Assuming that the antenna port indexes of the ePDCCH are antenna port 7 and antenna port 9, and a value of h is 4, then the antenna port 7 and antenna port 9 correspond to offset values 0 to 3.

Specific Applications:

In mode one, an offset value corresponding to the antenna port 7 is 0, and an offset value corresponding to the antenna port 9 is 2; and in mode two, an offset value corresponding to the antenna port 7 is 1, and an offset value corresponding to the antenna port 9 is 3, wherein, the mapping mode configured by the higher-layer signaling is mode one or mode two; or the correspondence is determined according to the user dedicated parameters, for example, a UE ID (C-RNTI), and when the C-RNTI is an odd number, mode one is used, and when the C-RNTI is an even number, mode two is used, vice versa.

Scenario Two

Assuming that the antenna port indexes of the ePDCCH are antenna port 7 and antenna port 8, and a value of h is 4, then the antenna port 7 and antenna port 8 correspond to offset values 0 to 3.

Specific Applications:

In mode one, an offset value corresponding to the antenna port 7 is 0, and an offset value corresponding to the antenna port 8 is 1; and in mode two, an offset value corresponding to the antenna port 7 is 2, and an offset value corresponding to the antenna port 8 is 3, wherein, the mapping mode configured by the higher-layer signaling is mode one or mode two.

Scenario Three

Assuming that the antenna port indexes of the ePDCCH are antenna port 7 and antenna port 8, then the antenna port 7 and the antenna port 8 correspond to offset values a1 and a2, values of a1 and a2 are configured by the indication signaling.

Assuming that the antenna port indexes of the ePDCCH are antenna port 7, antenna port 8, antenna port 9 and antenna port 10, then the antenna port 7, antenna port 8, antenna port 9 and antenna port 10 correspond to offset values a1, a2, a3 and a4, values of a1, a2, a3 and a4 are configured by the indication signaling.

Scenario Four

Offset=offset1+ARI, wherein, offset1 is determined according to the antenna port indexes of the ePDCCH, and the ARI value is configured by the indication signaling; the mode for determining the offset1 according to the antenna port indexes of the ePDCCH may use the above mode for determining the offset according to the antenna port indexes of the ePDCCH.

Method Four

The offset value is determined according to the indication signaling (for example, the ARI); the values of the indication signaling are a1, a2, a3 and a4, wherein, the specific values of the a1, a2, a3 and a4 are configured by signaling, or are predefined values, for example, 0, 1, 2 and 3, or −1, 0, 1 and 2, or −2, 0, 2 and 4 etc.

Method Five

The offset (offset1) corresponding to the ePDCCH in a distributed transmission mode is a fixed value 0, and the offset (offset1) corresponding to the ePDCCH in a localized transmission mode is determined using other methods as described above;

When there are multiple antenna ports corresponding to the ePDCCH, the offset is determined according to antenna port information which corresponds to a minimum (maximum) L-eCCE (D-eCCE) index corresponding to the ePDCCH, and for a distributed transmission mode, the offset is determined according to the antenna port information of the D-eCCE index in the physical resource block index $n_{PRB}$.

The correspondence is not limited to the above modes.

in the step of an apparatus determining a channel resource index $n_{PUCCH}^{(1)}$ of the PUCCH according to physical resources of the ePDCCH, the physical resources of the ePDCCH include a physical resource block index $n_{PRB}$ of the ePDCCH; $n_{PUCCH}^{(1)} = f(n_{PRB}) + \text{offset} + N_{PUCCH}^{Start}$, wherein, the $$f(n_{PR}) = f(n_{PRB}) = n_{PRB} \times h; \text{ the } n_{PRB} = \left\lfloor \frac{n_{eCCE}}{h} \right\rfloor,$$

$n_{eCCE}$ is an eCCE index for carrying the ePDCCH; h is the maximum number of the uplink control channel resources corresponding to one physical resource block carrying the ePDCCH, or h is the number of eCCEs included in one physical resource block carrying the ePDCCH, or h is indicated by signaling, or h is a predefined positive integer, such as 1, 2, 4 or 8 etc.

For a TDD system.

Mode One when the apparatus transmits all ACKs/NACKs of the PDSCH on M downlink subframes on an uplink subframe n, in the step of the apparatus determining the channel resource index $n_{PUCCH,m}^{(1)}$ of the PUCCH according to the physical resources of the ePDCCH on the downlink subframe k, physical resources of the ePDCCH on the downlink subframe k include a physical resource block index $n_{PRB}$ of the ePDCCH:

$n_{PUCCH,m}^{(1)} = (M-m-1) \times N_x + m \times N_x + f(n_{PRB}) + \text{offset} + N_{PUCCH}^{Start}$ wherein, m is a sequence number of the downlink subframe k where the received PDSCH is located in the M downlink subframes corresponding to the uplink subframe n, and $0 \le m \le M-1$; $N_x$ is a predefined parameter, and the selection of x ensures $N_x \le f(n_{PR}) + \text{offset} \le N_{x+1}, x \in \{0, 1, \Lambda, r-1\}$ and $$N_x = \left\lfloor \frac{N_{ePDCCH}^{Total}}{r} \right\rfloor \times x, \text{ or } N_x = \left\lfloor \frac{N_{ePDCCH}^{Total} \times x}{r} \right\rfloor, \text{ or}$$

$$N_x = \left\lfloor N_{ePDCCH}^{Total} \times \frac{x}{r} \right\rfloor, \text{ or } N_x = \left\lfloor \frac{N_{ePDCCH}^{Total}}{r} \times x \right\rfloor,$$

$N_{ePDCCH}^{Total}$ represents the total number or PUCCHs corresponding to the ePDCCH region or is indicated by the signaling; and r is greater than or equal to 1.

For a TDD system.

Mode Two when the apparatus transmits all ACKs/NACKs of the PDSCH on M downlink subframes on an uplink subframe n, in the step of the apparatus determining the channel resource index $n_{PUCCH,m}^{(1)}$ of the PUCCH according to the physical resources of the ePDCCH on the downlink subframe k, physical resources of the ePDCCH include a physical resource block index $n_{PRB}$ of the ePDCCH on the subframe k:

$$n_{PUCCH,m}^{(1)} = \sum_{q=0}^{m} N_{ePDCCH,q}^{Total} + f(n_{PRB}) + \text{offset} + N_{PUCCH}^{Start}$$

wherein, m is a sequence number of downlink subframe k where the received PDSCH is located in the M downlink subframes corresponding to the uplink subframe n, and $0 \le m \le M-1$; $N_{ePDCCH,m}^{Total}$ represents the total number of PUCCHs corresponding to the ePDCCH region on the downlink subframe k or is indicated by the signaling;

assuming that the total number of the configured physical resource blocks for transmitting the ePDCCH on the downlink subframe k is $N_{PRB,m}^{Total}$, $N_{ePDCCH,m}^{Total} = N_{PRB,m}^{Total} \times h$, wherein, h is the maximum number of the PUCCHs corresponding to one physical resource block, or h is the maximum number of eCCEs included in one physical resource block, or h is indicated by signaling, or h is a predefined positive integer.

Embodiment Two a channel resource index $n_{PUCCH}^{(1)}$ of a corresponding physical uplink control channel PUCCH is determined according to physical resources of the ePDCCH; wherein, the PUCCH is used to carry positive acknowledgement/negative acknowledgement ACK/NACK information of the physical downlink shared channel PDSCH indicated by the enhanced physical downlink control channel ePDCCH; and the physical resources of the ePDCCH include enhanced control channel element index $n_{eCCE}$;

Alternatively, the following application scenarios are included.

A region of the ePDCCH in a distributed transmission mode and a region of the ePDCCH in a localized transmission mode are the same; i.e., the shared physical resources can not only be used to transmit the ePDCCH in a distributed transmission mode, but also can be used to transmit the ePDCCH in localized transmission mode; and both of them can be transmitted in the same configured region.

The region of the ePDCCH in a distributed transmission mode and the region of the ePDCCH in a localized transmission mode are configured independently.

A method for renumbering the physical resources of the ePDCCH includes:

method one: numbering all configured physical resources of the ePDCCH in order;

method two: firstly concatenating the physical resources for ePDCCHs in different transmission modes, and then renumbering the physical resources of the ePDCCH in a concatenated order;

method three: renumbering the physical resources for the ePDCCHs in different transmission modes respectively.

Before the apparatus determines the channel resource index $n_{PUCCH}^{(1)}$ in an implicit mapping mode, the step of the apparatus determining a channel resource index $n_{PUCCH}^{(1)}$ of a PUCCH according to the physical resources of an ePDCCH comprises: the apparatus determining an initial position $N_{PUCCH}^{Start}$ of channel resources of the PUCCH, wherein, the $N_{PUCCH}^{Start}$ is an initial position $N_{PUCCH}^{(1)}$ of the channel resources of the PUCCH corresponding to an existing PDCCH; or the $N_{PUCCH}^{Start}$ is an initial position $N_{PUCCH}^{(1)}$ of the channel resource of the PUCCH corresponding to the existing PDCCH plus a predefined value D, wherein, the D represents the maximum number of channel resources of the PUCCH corresponding to the PDCCH in uplink subframes where the PUCCH is located; or the D represents the number of CCEs in subframes where the ePDCCH is located; or the $N_{PUCCH}^{Start}$ is the initial position $N_{PUCCH}^{(1)}$ of the channel resources of the PUCCH corresponding to the existing PDCCH plus the predefined value D plus V, wherein, the V is determined by signaling; or the $N_{PUCCH}^{Start}$ is determined by signaling; or the $N_{PUCCH}^{Start}$ is an initial position of PUCCH format 1a/1b resources in uplink subframes where the PUCCH is located.

For a TDD system, the initial positions may be different or the same in different uplink subframes, the initial positions in different transmission modes may be the same or different (i.e., the initial positions are independently configured, for example, an initial position in the distributed transmission mode is $N_{PUCCH}^{(4)}$, and an initial position in a localized transmission mode is $N_{PUCCH}^{(5)}$).

The distributed transmission mode includes transmitting the ePDCCH on distributed physical resource block indexes, and the localized transmission mode includes transmitting the ePDCCH on localized (renumbered) physical resource block indexes.

An enhanced Control Channel Element (eCCE) of the ePDCCH in a localized transmission mode is referred to as an L-eCCE, and an enhanced Control Channel Element (eCCE) of the ePDCCH in a distributed transmission mode is referred to as a D-eCCE; the L-eCCE is a resource in one physical resource block, and the D-eCCE is a resource in multiple physical resource blocks.

The $n_{eCCE}$ is obtained according to a maximum (or minimum) index of an enhanced control channel elements corresponding to the ePDCCH;

For the ePDCCH in a localized transmission mode, $n_{eCCE}$ is a maximum (minimum) L-eCCE index corresponding to the ePDCCH; or the $n_{eCCE}$ is the maximum (minimum) L-eCCE index corresponding to the ePDCCH plus Total-DeCCE, wherein, the Total-DeCCE represents the total number of available D-eCCEs or is indicated by signaling;

For the ePDCCH in a distributed transmission mode, determining $n_{eCCE}$ according to the maximum (or minimum) D-eCCE index carrying the ePDCCH comprises the following methods.

Determination Method One

The $n_{eCCE}$ is a maximum (minimum) D-eCCE index corresponding to the ePDCCH.

Determination Method Two

One D-eCCE is mapped onto h L-eCCEs, and all numbered D-eCCEs are divided into N groups, wherein, each group includes h D-eCCEs; one to one correspondence is established between h D-eCCEs in one group and the h L-eCCEs, wherein, the h D-eCCEs correspond to the same antenna port and are mapped onto the same L-eCCE, or the h D-eCCEs are mapped onto the same L-eCCE; and the $n_{eCCE}$ is determined according to a L-eCCE corresponding to a position of the D-eCCE index in the above divided groups.

Determination Method Three

One D-eCCE is mapped onto two L-eCCEs, when the D-eCCE index is an odd number, it is determined that the $n_{eCCE}$ is a minimum L-eCCE index where the D-eCCE index is located, and when the D-eCCE index is an even number, it is determined that the $n_{eCCE}$ is a maximum L-eCCE index where the D-eCCE index is located; or when the D-eCCE index is an odd number, it is determined that the $n_{eCCE}$ is a maximum L-eCCE index where the D-eCCE index is located, and when the D-eCCE index is an even number, it is determined that the $n_{eCCE}$ is a minimum L-eCCE index where the D-eCCE index is located.

Determination Method Four

The $n_{eCCE}$ is the maximum (minimum) D-eCCE index corresponding to the ePDCCH plus Total-LeCCE, wherein, the Total-LeCCE represents the total number of available L-eCCEs or is indicated by signaling.

Specific Application One

Assuming that there are 100 physical resource blocks available in a system, with corresponding numbers from #0 to #99, physical resource block indexes for transmitting an ePDCCH are #4, #5, #12, #13, #20, #21, #28 and #29, i.e., being able to transmit not only an ePDCCH in a localized transmission mode but also an ePDCCH in a distributed transmission mode, then one physical resource block corresponds to 4 L-eCCEs, and all available L-eCCEs are numbered as #0 to #31 in an order according to sizes of the physical resource block indexes;

L-eCCE indexes of the physical resource blocks where the ePDCCH of the apparatus is located are #4, #5, #6 and #7, and the transmission mode of the ePDCCH is a localized transmission mode, When the $n_{eCCE}$ is a maximum physical resource index corresponding to the ePDCCH, $n_{eCCE}$ is 7; and when the $n_{eCCE}$ is a minimum physical resource index corresponding to the ePDCCH, $n_{eCCE}$ is 4;

when one D-eCCE is mapped onto two physical resource blocks, each physical resource block corresponds to one L-eCCE, and the two physical resource blocks correspond to 8 D-eCCEs, wherein, numbers of the D-eCCEs corresponding to the physical resource block indexes #4 and #12 are 0 to 7, numbers of the D-eCCEs corresponding to the physical resource block indexes #5 and #13 are 8 to 15, numbers of the D-eCCEs corresponding to the physical resource block indexes #20 and #28 are 16 to 23, and numbers of the D-eCCEs corresponding to the physical resource block indexes #21 and #29 are 24 to 31; D-eCCE indexes #x and #y correspond to an L-eCCE index #z and an L-eCCE index #t, wherein, one-to-one correspondence is established between (x, y) and (z, t), for example, x corresponds to z and y corresponds to t. It is determined according to the minimum D-eCCE index corresponding to the ePDCCH that when the D-eCCE index is x, the $n_{eCCE}$ is z, and when the D-eCCE index is y, the $n_{eCCE}$ is t.

Specific Application Two

Assuming that there are 100 physical resource blocks available in a system, with corresponding numbers from #0 to #99, physical resource block indexes for transmitting an ePDCCH are #4, #8, #12, #16, #20, #24, #28 and #32, wherein, physical resource block indexes #4, #12, #20 and #28 are used to transmit an ePDCCH in a localized transmission mode, and physical resource block indexes #8, #16, #24 and #32 are used to transmit an ePDCCH in a distributed transmission mode, then one physical resource block corresponds to 2 L-eCCEs, and all physical resource blocks are divided according to the L-eCCEs, and all L-eCCEs are numbered into #0 to #15 in an order according to sizes of the physical resource block indexes;

eCCE indexes of the physical resource blocks where the ePDCCH of the apparatus is located are #5 and #6, the transmission mode of the ePDCCH is a localized transmission mode, and it is mapped onto a physical resource block #12, and when the $n_{eCCE}$ is a maximum physical resource index corresponding to the ePDCCH, $n_{eCCE}$ is 6; and when the $n_{eCCE}$ is a minimum physical resource index corresponding to the ePDCCH, $n_{eCCE}$ is 5;

One D-eCCE is mapped onto two L-eCCEs, the two physical resource blocks correspond to 4 D-eCCEs, wherein, numbers of the D-eCCEs corresponding to the physical resource indexes #8 and #16 are 0 to 3, numbers of the D-eCCEs corresponding to the physical resource indexes #24 and #32 are 4 to 7; D-eCCE indexes #x and #y correspond to an L-eCCE index #z and an L-eCCE index #t, wherein, one-to-one correspondence is established between (x, y) and (z, t), for example, x corresponds to z and y corresponds to t. It is determined according to the minimum (maximum) D-eCCE index corresponding to the ePDCCH that when the D-eCCE index is x, the $n_{eCCE}$ is z, and when the D-eCCE index is y, the $n_{eCCE}$ is t. For example, D-eCCE#0 and D-eCCE#1 correspond to L-eCCE#2 and L-eCCE#6, D-eCCE#2 and D-eCCE#3 correspond to L-eCCE#3 and L-eCCE#7, D-eCCE#4 and D-eCCE#5 correspond to L-eCCE#10 and L-eCCE#14, D-eCCE#6 and D-eCCE#7 correspond to L-eCCE#11 and L-eCCE#15; and when the D-eCCEs corresponding to the ePDCCH are #0 to #3, it is determined according to a minimum D-eCCE index corresponding to the ePDCCH that when the D-eCCE index is 0, the $n_{eCCE}$ is 2; and it is determined according to a maximum D-eCCE index corresponding to the ePDCCH that when the D-eCCE index is 3, the $n_{eCCE}$ is 7.

Specific Application Three

Assuming that there are 50 physical resource blocks available in a system, with corresponding numbers from #0 to #49, physical resource block indexes for transmitting an ePDCCH are #4, #8, #12, #16, #20, #24, #28 and #32, wherein, physical resource block indexes #4, #12, #20 and #28 are used to transmit an ePDCCH in a localized transmission mode, and physical resource block indexes #8, #16, #24 and #32 are used to transmit an ePDCCH in a distributed transmission mode, then the physical resource blocks for transmitting the ePDCCH in a distributed transmission mode and the physical resource blocks for transmitting the ePDCCH in a localized transmission mode are concatenated as physical resource block indexes #4, #12, #20, #28, #8, #16, #24 and #32;

One physical resource block corresponds to 2 L-eCCEs, and all physical resource blocks for transmitting the ePDCCH in a localized transmission mode are divided according to the L-eCCEs, and all L-eCCEs are numbered as #0 to #7 according to a concentrated order, and the total number Total-LeCCE of the available L-eCCEs is 8; L-eCCE indexes of the physical resource blocks where the ePDCCH of the apparatus is located are #2 and #3, the transmission mode of the ePDCCH is a localized transmission mode, and is mapped onto a physical resource block #12, and when the $n_{eCCE}$ is a maximum physical resource index corresponding to the ePDCCH, $n_{eCCE}$ is 3; and when the $n_{eCCE}$ is a minimum physical resource index corresponding to the ePDCCH, $n_{eCCE}$ is 2;

One physical resource block corresponds to two D-eCCEs, wherein, numbers of the D-eCCEs corresponding to the physical resource indexes #8 and #16 are 0 to 3, numbers of the D-eCCEs corresponding to the physical resource indexes #24 and #32 are 4 to 7; the $n_{eCCE}$ is a maximum (minimum) D-eCCE index corresponding to the ePDCCH plus Total-LeCCE, wherein, the Total-LeCCE represents the total number 8 of the available L-eCCEs; when the D-eCCEs corresponding to the ePDCCH are #0 to #3, it is determined according to a minimum D-eCCE index corresponding to the ePDCCH that when the D-eCCE index is 0, the $n_{eCCE}$ is 8+0=8; and it is determined according to a maximum D-eCCE index corresponding to the ePDCCH that when the D-eCCE index is 3, the $n_{eCCE}$ is 8+3=11.

Specific Application Four

Assuming that there are 50 physical resource blocks available in a system, with corresponding numbers from #0 to #49, physical resource block indexes for transmitting an ePDCCH are #4, #8, #12, #16, #20, #24, #28 and #32, wherein, physical resource block indexes #4, #12, #20 and #28 are used to transmit an ePDCCH in a localized transmission mode, and physical resource block indexes #8, #16, #24 and #32 are used to transmit an ePDCCH in a distributed transmission mode, then One physical resource block corresponds to 2 D-eCCEs, and all physical resource blocks for transmitting the ePDCCH in a distributed transmission mode are divided according to the D-eCCEs, and all D-eCCEs are numbered as #0 to #7 in order and the total number Total-DeCCE of the available D-eCCEs is 8; eCCE indexes of the physical resource block where the ePDCCH of the apparatus is located are #2 and #3, the transmission mode of the ePDCCH is a distributed transmission mode, and is mapped onto physical resource blocks #8 and #16, and the $n_{eCCE}$ is a maximum (minimum) D-eCCE index corresponding to the ePDCCH, and when the $n_{eCCE}$ is a maximum physical resource index corresponding to the ePDCCH, $n_{eCCE}$ is 3; and when the $n_{eCCE}$ is a minimum physical resource index corresponding to the ePDCCH, $n_{eCCE}$ is 2;

One physical resource block corresponds to 2 L-eCCEs, and all physical resource blocks for transmitting the ePDCCH in a localized transmission mode are divided according to the L-eCCEs, and all L-eCCEs are numbered as #0 to #7 in order; the $n_{eCCE}$ is a maximum (minimum) L-eCCE index corresponding to the ePDCCH plus Total-DeCCE, wherein, the Total-DeCCE represents the total number 8 of the available D-eCCEs; when the L-eCCEs corresponding to the ePDCCH are #6 to #7, it is determined according to a minimum D-eCCE index corresponding to the ePDCCH that when the L-eCCE index is 6, the $n_{eCCE}$ is 8+6=14; and it is determined according to a maximum D-eCCE index corresponding to the ePDCCH that when the L-eCCE index is 7, the $n_{eCCE}$ is 8+7=15.

Specific Application Five

Assuming that there are 50 physical resource blocks available in a system, with corresponding numbers from #0 to #49, physical resource block indexes for transmitting an ePDCCH are #4, #8, #12, #16, #20, #24, #28 and #32, wherein, physical resource block indexes #4, #12, #20 and #28 are used to transmit an ePDCCH in a localized transmission mode, and physical resource block indexes #8, #16, #24 and #32 are used to transmit an ePDCCH in a distributed transmission mode, then One physical resource block corresponds to 4 D-eCCEs, and all physical resource blocks for transmitting the ePDCCH in a localized transmission mode are divided according to the D-eCCEs, and all D-eCCEs are numbered as #0 to #15 in order; eCCE indexes of the physical resources where the ePDCCH of the apparatus is located are #12 and #15, the transmission mode of the ePDCCH is a distributed transmission mode, and the $n_{eCCE}$ is a maximum (minimum) D-eCCE index corresponding to the ePDCCH, and when the $n_{eCCE}$ is a maximum physical resource index corresponding to the ePDCCH, $n_{eCCE}$ is 15; and when the $n_{eCCE}$ is a minimum physical resource index corresponding to the ePDCCH, $n_{eCCE}$ is 12;

One physical resource block corresponds to 4 L-eCCEs, and all physical resource blocks for transmitting the ePDCCH in a localized transmission mode are divided according to the L-eCCEs, and all L-eCCEs are numbered as #0 to #15 in order; L-eCCE indexes of the physical resources where the ePDCCH of the apparatus is located are #4 and #5, and the $n_{eCCE}$ is a maximum (minimum) L-eCCE index corresponding to the ePDCCH, and when the $n_{eCCE}$ is a maximum physical resource index corresponding to the ePDCCH, $n_{eCCE}$ is 5; and when the $n_{eCCE}$ is a minimum physical resource index corresponding to the ePDCCH, $n_{eCCE}$ is 4.

The step of an apparatus determining a channel resource index $n_{PUCCH}^{(1)}$ of the PUCCH according to physical resources of an ePDCCH comprises: the apparatus determining an offset, wherein, the offset is determined according to any one or more of the following information: antenna port information of the ePDCCH, indication signaling, a transmission mode of the ePDCCH, a position of the ePDCCH in the physical resource block, an enhanced control channel element index corresponding to the ePDCCH, and an enhanced resource unit group index corresponding to the ePDCCH; or the offset is a fixed value, for example, 0, 1 and 3 or other values.

The method for determining the offset is described as follows.

Method One

One-to-one correspondence is established between the antenna port information and the offset value, and the offset value is determined according to the antenna port information used by the ePDCCH; and a range of the offset value is 0 to h−1; wherein, the antenna port information used by the ePDCCH includes antenna port indexes.

Scenario One

Assuming that the antenna port indexes of the ePDCCH are antenna port 7, antenna port 8, antenna port 9 and antenna port 10, and a value of h is 4, then the antenna port 7, antenna port 8, antenna port 9 and antenna port 10 correspond to offset values 0 to 3 one by one.

For example, an offset value corresponding to the antenna port 7 is 0, an offset value corresponding to the antenna port 8 is 1, an offset value corresponding to the antenna port 9 is 2, and an offset value corresponding to the antenna port 10 is 3, and the correspondence is not limited thereto; and the correspondence for different users may be the same or different.

Scenario Two

Assuming that the antenna port indexes of the ePDCCH are antenna port 7 and antenna port 9, and a value of h is 4, then the antenna port 7 and antenna port 9 correspond to offset values 0 to 3.

For example, an offset value corresponding to the antenna port 7 is 0, and an offset value corresponding to the antenna port 9 is 2, or an offset value corresponding to the antenna port 7 is 1, and an offset value corresponding to the antenna port 9 is 3.

Scenario Three

Assuming that the antenna port indexes of the ePDCCH are antenna port 7 and antenna port 8, and a value of h is 2, then the antenna port 7 and antenna port 8 correspond to offset values 0 to 1.

For example, an offset value corresponding to the antenna port 7 is 0, and an offset value corresponding to the antenna port 8 is 1.

Method Two

One-to-one correspondence is established between the antenna port information and the offset value, and the offset value is determined according to the antenna port information used by the ePDCCH; and a range of the offset value is 0 to h−1; wherein, the antenna port information used by the ePDCCH includes antenna port indexes and initial sequence information corresponding to the antenna ports (an SCID and/or a virtual cell ID).

Scenario One

Assuming that the antenna port indexes of the ePDCCH are antenna port 7, antenna port 8, antenna port 9 and antenna port 10, and a value of h is 8, a value of the SCID is 0 or 1, and the virtual cell ID is x(0) or x(1), then the antenna port 7/8/9/10 with an SCID of 0 and the antenna port 7/8/9/10 with an SCID of 1 correspond to offset values 0 to 7 one by one; or the antenna port 7/8/9/10 with a virtual cell ID of x(0) and the antenna port 7/8/9/10 with a virtual cell ID of x(1) correspond to offset values 0 to 7 one by one; or the antenna port 7/8/9/10 with an SCID of 0 and a virtual cell ID of x(0) and the antenna port 7/8/9/10 with an SCID of 1 and a virtual cell ID of x(1) correspond to offset values 0 to 7 one by one.

For example, when the virtual cell ID is x(0), an offset value corresponding to the antenna port 7 is 0, an offset value corresponding to the antenna port 8 is 1, an offset value corresponding to the antenna port 9 is 2, and an offset value corresponding to the antenna port 10 is 3; and when the virtual cell ID is x(1), an offset value corresponding to the antenna port 7 is 4, an offset value corresponding to the antenna port 8 is 5, an offset value corresponding to the antenna port 9 is 6, and an offset value corresponding to the antenna port 10 is 7, and the correspondence is not limited thereto; and the correspondence for different users may be the same or different.

Scenario Two

Assuming that the antenna port indexes of the ePDCCH are antenna port 7 and antenna port 8, and a value of h is 4, a value of the SCID is 0 or 1, and the virtual cell ID is x(0) or x(1), then the antenna port 7/8 with an SCID of 0 and the antenna port 7/8 with an SCID of 1 correspond to offset values 0 to 3 one by one; or the antenna port 7/8 with a virtual cell ID of x(0) and the antenna port 7/8 with a virtual cell ID of x(1) correspond to offset values 0 to 3 one by one; or the antenna port 7/8 with an SCID of 0 and a virtual cell ID of x(0) and the antenna port 7/8 with an SCID of 1 and a virtual cell ID of x(1) correspond to the offset values 0 to 3 one by one.

For example, when the virtual cell ID is x(0), an offset value corresponding to the antenna port 7 is 0, and an offset value corresponding to the antenna port 8 is 1; and when the virtual cell ID is x(1), an offset value corresponding to the antenna port 7 is 2, and an offset value corresponding to the antenna port 8 is 3, and the correspondence is not limited thereto; and the correspondence for different users may be the same or different.

Method Three

One-to-one correspondence is established between the antenna port information and the offset value, and the offset value is determined according to the antenna port information used by the ePDCCH and indication signaling;

the indication signaling includes higher-layer signaling or user dedicated parameters (for example a C-RNTI) etc.;

One-to-one correspondence between the antenna port information and the offset value is configured by higher-layer signaling or is determined according to the user dedicated parameters.

Scenario One

Assuming that the antenna port indexes of the ePDCCH are antenna port 7 and antenna port 9, and a value of h is 4, then the antenna port 7 and antenna port 9 correspond to offset values 0 to 3.

Specific Applications:

Mode one: an offset value corresponding to the antenna port 7 is 0, and an offset value corresponding to the antenna port 9 is 2; and mode two: an offset value corresponding to the antenna port 7 is 1, and an offset value corresponding to the antenna port 9 is 3, wherein, the specific mapping mode configured by the higher-layer signaling is mode one or mode two; or the correspondence is determined according to the user dedicated parameters, for example, a UE ID (C-RNTI), and when the C-RNTI is an odd number, mode one is used, and when the C-RNTI is an even number, mode two is used, vice versa.

Scenario Two

Assuming that the antenna port indexes of the ePDCCH are antenna port 7 and antenna port 8, and a value of h is 4, then the antenna port 7 and antenna port 8 correspond to offset values 0 to 3.

Specific Applications:

Mode one: an offset value corresponding to the antenna port 7 is 0, and an offset value corresponding to the antenna port 8 is 1; and mode two: an offset value corresponding to the antenna port 7 is 2, and an offset value corresponding to the antenna port 8 is 3, wherein, the specific mapping mode configured by the higher-layer signaling is mode one or mode two.

Scenario Three

Assuming that the antenna port indexes of the ePDCCH are antenna port 7 and antenna port 8, then the antenna port 7 and the antenna port 8 correspond to offset values a1 and a2, specific values of a1 and a2 are configured by the indication signaling.

Assuming that the antenna port indexes of the ePDCCH are antenna port 7, antenna port 8, antenna port 9 and antenna port 10, then the antenna port 7, antenna port 8, antenna port 9 and antenna port 10 correspond to offset values a1, a2, a3 and a4, specific values of a1, a2, a3 and a4 are configured by the indication signaling.

Scenario Four

Offset=offset1+ARI, wherein, offset1 is determined according to the antenna port indexes of the ePDCCH, and the ARI value is configured by the indication signaling; the mode for determining the offset1 according to the antenna port indexes of the ePDCCH may use the above mode for determining the offset according to the antenna port indexes of the ePDCCH.

When there are multiple antenna ports corresponding to the ePDCCH, the offset is determined according to antenna port information which corresponds to a minimum (maximum) L-eCCE (D-eCCE) index corresponding to the ePDCCH, and for a distributed transmission mode, the offset is determined according to the antenna port information of the D-eCCE index in the physical resource block index $n_{PRB}$.

Method Four

The offset value is determined according to the indication signaling (for example, the ARI).

Method Five

The offset (offset1) corresponding to the ePDCCH in a distributed transmission mode is a fixed value 0, and the offset (offset1) corresponding to the ePDCCH in a localized transmission mode is determined using other methods as described above;

When there are multiple antenna ports corresponding to the ePDCCH, the offset is determined according to antenna port information which corresponds to a minimum (maximum) L-eCCE (D-eCCE) index corresponding to the ePDCCH, and for a distributed transmission mode, the offset is determined according to the antenna port information of the L-eCCE corresponding to the D-eCCE index, or for a distributed transmission mode, the offset is determined according to the antenna port information corresponding to the D-eCCE index in the minimum (maximum) physical resource block index corresponding to the D-eCCE index.

The correspondence is not limited to the correspondence in the above examples.

In the step of an apparatus determining a channel resource index $n_{PUCCH}^{(1)}$ of a corresponding physical uplink control channel PUCCH according to physical resources of the ePDCCH, the physical resources of the ePDCCH include an enhanced control channel element index $n_{eCCE}$ of the ePDCCH:

$$n_{PUCCH}^{(1)} = f(n_{eCCE}) + \text{offset} + N_{PUCCH}^{Start},$$

Mode One $$f(n_{eCCE}) = \left\lfloor \frac{n_{eCCE}}{h} \right\rfloor;$$

h is the maximum number of the uplink control channel resources corresponding to one physical resource block carrying the ePDCCH, or h is indicated by signaling, or h is a predefined positive integer, such as 1, 2 and 4 etc.

Mode Two $$f(n_{eCCE}) = n_{eCCE}.$$

Mode Three

For the ePDCCH in a distributed transmission mode, $f(n_{eCCE}) = n_{eCCE}$, and offset is 0 or is determined according to indication signaling, wherein, for the ePDCCH in a localized transmission mode, $$f(n_{eCCE}) = \left\lfloor \frac{n_{eCCE}}{h} \right\rfloor,$$

and offset is determined according to the above method.

For a TDD system,

Mode One when the apparatus transmits all ACKs/NACKs of the PDSCH on M downlink subframes on an uplink subframe n, in the step of the apparatus determining the channel resource index $n_{PUCCH,m}^{(1)}$ of the PUCCH according to the physical resources of the ePDCCH on the downlink subframe k, the physical resources of the ePDCCH include physical resource block index $n_{eCCE}$ of the ePDCCH on the downlink subframe k:

$$n_{PUCCH,m}^{(1)} = (M-m-1) \times N_x + m \times N_x + f(n_{eCCE}) + \text{offset} + N_{PUCCH}^{Start}$$

wherein, m is a sequence number of the downlink subframe k where the received PDSCH is located in the M downlink subframes corresponding to the uplink subframe n, and $0 \leq m \leq M-1$; $N_x$ is a predefined parameter, and the selection of x ensures $N_x \leq f(n_{PR})+\text{offset} \leq N_{x+1}$, $x \in \{0, 1, \Lambda, r-1\}$ and $$N_x = \left\lfloor \frac{N_{ePDCCH}^{Total}}{r} \right\rfloor \times x, \text{ or } N_x = \left\lfloor \frac{N_{ePDCCH}^{Total} \times x}{r} \right\rfloor, \text{ or }$$

$$N_x = \left\lfloor N_{ePDCCH}^{Total} \times \frac{x}{r} \right\rfloor, \text{ or } N_x = \left\lceil \frac{N_{ePDCCH}^{Total}}{r} \times x \right\rceil,$$

$N_{ePDCCH}^{Total}$ represents the total number of PUCCHs corresponding to the ePDCCH region of one downlink subframe or is indicated by the signaling.

Assuming that the total number of the configured physical resource blocks for transmitting the ePDCCH is $N_{ePDCCH}^{Total}$. $N_{ePDCCH}^{Total} = N_{PRB}^{Total} \times h$, wherein, h is the maximum number of the PUCCH corresponding to one physical resource block, or h is the maximum number of eCCEs included in one physical resource block, or h is indicated by signaling, or h is a predefined positive integer.

for a TDD system,

Mode Two when the apparatus transmits all ACKs/NACKs of the PDSCH on M downlink subframes on an uplink subframe n, in the step of the apparatus determining the channel resource index $n_{PUCCH,m}^{(1)}$ of the PUCCH according to the physical resources of the ePDCCH on the downlink subframe k, physical resources of the ePDCCH include a physical resource block index $n_{PRB}$ of the ePDCCH:

$$n_{PUCCH,m}^{(1)} = \sum_{q=0}^{m} N_{ePDCCH,q}^{Total} + f(n_{PRB}) + \text{offset} + N_{PUCCH}^{Start}$$

wherein, m is a sequence number of downlink subframe k where the received PDSCH is located in the M downlink subframes corresponding to the uplink subframe n, and $0 \leq m \leq M-1$; $N_{ePDCCH,m}^{Total}$ represents the total number of PUCCHs corresponding to the ePDCCH region on the downlink subframe k;

assuming that the total number of the configured physical resource blocks for transmitting the ePDCCH on the downlink subframe k is $N_{PRB,m}^{Total}$, $N_{ePDCCH,m}^{Total} = N_{PRB,m}^{Total} \times h$, wherein, h is the maximum number of the PUCCHs corresponding to one physical resource block, or h is the maximum number of eCCEs included in one physical resource block, or h is indicated by signaling, or h is a predefined positive integer.

Embodiment Three

For the ePDCCH in a distributed transmission mode, in the step of an apparatus determining a channel resource index $n_{PUCCH}^{(1)}$ of the PUCCH according to physical resources of the ePDCCH, the physical resources of the ePDCCH comprises an enhanced control channel element index $n_{eCCE}$ of the ePDCCH:

$$n_{PUCCH}^{(1)} = f(n_{eCCE}) + \text{offset} + N_{PUCCH}^{Start}.$$

Mode One $$f(n_{eCCE}) = \left\lfloor \frac{n_{eCCE}}{h} \right\rfloor,$$

h is the maximum number of the uplink control channel resources corresponding to one physical resource block carrying the ePDCCH, or h is indicated by signaling, or h is a predefined positive integer.

Mode Two $$f(n_{eCCE}) = n_{eCCE}.$$

Mode Three

For the ePDCCH in a distributed transmission mode, $f(n_{eCCE}) = n_{eCCE}$, and the offset is 0 or is determined according to indication signaling.

For the ePDCCH in a localized transmission mode, in the step of an apparatus determining a channel resource index $n_{PUCCH}^{(1)}$ of a corresponding physical uplink control channel PUCCH according to physical resources of the ePDCCH, the physical resources of the ePDCCH comprises a physical resource block index $n_{PRB}$ of the ePDCCH:

$$n_{PUCCH}^{(1)} = f(n_{PRB}) + \text{offset} + N_{PUCCH}^{Start},$$

wherein, $f(n_{PRB}) = n_{PRB} \times h$, h is the maximum number of the uplink control channel resources corresponding to one physical resource block carrying the ePDCCH, or h is the number of enhanced control channel elements included in one physical resource block carrying the ePDCCH, or h is indicated by signaling, or h is a predefined positive integer.

Embodiment Four

When N PUCCH resources are configured by a higher layer, the UE determines a currently used PUCCH resource according to a corresponding antenna port of the ePDCCH, or assuming that N localized eCCEs (L-eCCEs or D-eCCEs) are grouped, the UE determines a currently used PUCCH resource according to a position of a (minimum or maximum) eCCE index corresponding to the ePDCCH in the group.

Assuming that four PUCCH resources are configured by a base station to the apparatus, and antenna ports corresponding to the ePDCCH of the apparatus include: antenna port 7, antenna port 8, antenna port 9 and antenna port 10, then the antenna ports correspond to the PUCCH resources one by one; and the apparatus determines the antenna port according to a minimum (maximum) eCCE index corresponding to the ePDCCH, thereby determining a corresponding PUCCH resource.

Assuming that four PUCCH resources are configured by a base station to the apparatus, four eCCEs are in one group, and four eCCEs in the same group correspond to the PUCCH resources one by one, the apparatus determines a position in the group according to a minimum (maximum) eCCE index corresponding to the ePDCCH in the group, thereby determining a corresponding PUCCH resource.

In the above various embodiments, the antenna ports 7-10 are merely used as an example, and there may be other antenna ports, for example, antenna ports 107-110 etc., wherein, time-frequency locations of pilots corresponding to the antenna port 107-110 are the same as those corresponding to the antenna ports 7-10 in LTE R10 release.

Figures 4, 5:
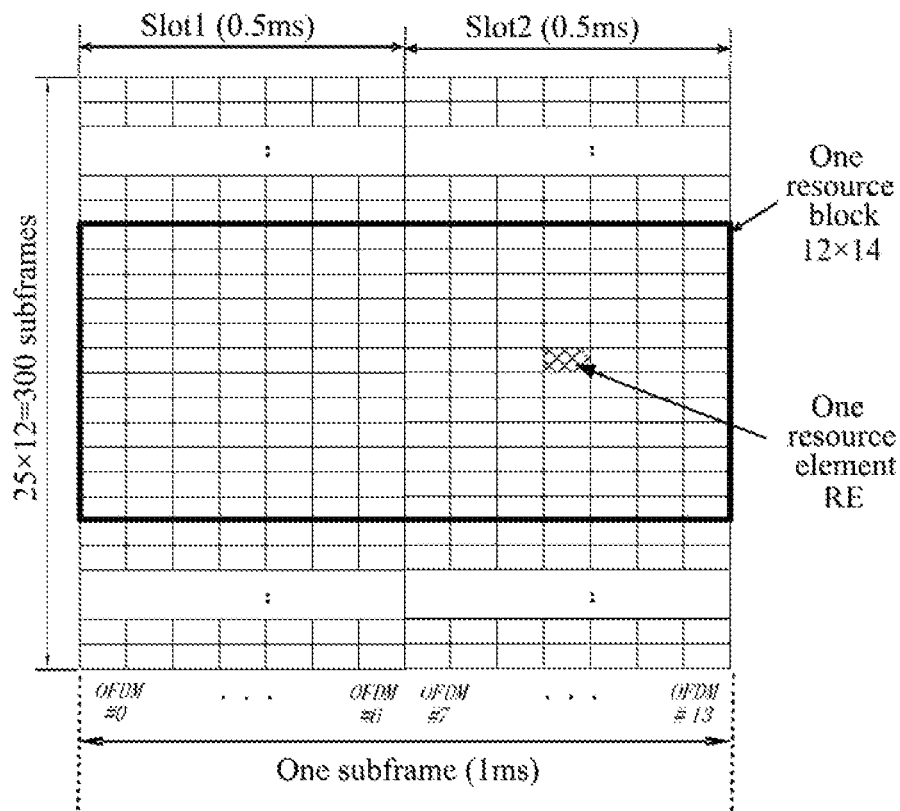
FIG. 4 is a diagram of a definition of physical resource blocks.
FIG. 5 is a structural diagram of an apparatus according to an embodiment of the present document.

As shown in FIG. 5, the embodiments of the present document further provide an apparatus, which is a terminal or a base station. The apparatus comprises: a channel resource determination unit 50, configured to determine a channel resource index $n_{PUCCH}^{(1)}$ of a Physical Uplink Control Channel (PUCCH) according to physical resources of an enhanced Physical Downlink Control Channel (ePDCCH), wherein, the PUCCH is used for carrying positive acknowledgement/negative acknowledgement (ACK/

NACK) information about a Physical Downlink Shared Channel (PDSCH) indicated by the ePDCCH; and the physical resources of the ePDCCH comprise: any one or more of a physical resource block, an enhanced control channel element and an antenna port index.

It should be illustrated that, multiple details described in the above method embodiments are similarly applied to the channel resource determination unit, and therefore, the repetitive description of the same or similar parts is omitted.

In another embodiment, software for determining resources in a PUCCH channel in a large bandwidth system is further provided, which is used to perform technical solutions described in the above embodiments and preferred embodiments.

In another embodiment, a storage medium is further provided, which stores the above software. The storage medium includes a disc, a floppy disk, a hard disk and an erasable memory etc.

The above embodiments and preferred embodiments can ensure the compatibility of an LTE-Advanced system and an LTE Release-8 system, and facilitate improving the system capacity and the scheduling flexibility of the LTE-Advanced system, thereby enabling an LTE-Advanced terminal to obtain a maximum frequency selectivity gain.

Obviously, those skilled in the art should understand that each module or each step of the aforementioned present document can be implemented with general computing devices, and can be integrated in a single computing device, or distributed onto a network consisting of a plurality of computing devices; alternatively, they can be implemented with program codes executable by the computing devices, and therefore, they can be stored in storage devices to be executed by the computing devices; alternatively, they are respectively made into various integrated circuit modules; alternatively, it is implemented with making several modules or steps of them into a single integrated circuit module. Thus, the embodiments of the present document are not limited to any specific combinations of hardware and software.

The above description is only the preferred embodiments of the present document and is not intended to limit the present document. For those skilled in the art, the embodiments of the present document can have various modifications and variations. Any of modification, equivalent and improvement etc., which is made within the spirit and principle of the present document, should be contained within the protection scope of the present document.

INDUSTRIAL APPLICABILITY

With the method and apparatus according to the embodiments of the present document, it ensures normal operation of the HARQ process corresponding to the ePDCCH, and ensures the compatibility of an LTE-Advanced system and an LTE Release-8 system.

What is claimed is:

1. A method for determining resources in a Physical Uplink Control Channel (PUCCH), comprising:
an apparatus determining a channel resource index $n_{PUCCH}^{(1)}$ of the PUCCH according to an antenna port index and any one or both of a physical resource block and an enhanced Control Channel Element (eCCE) of an enhanced Physical Downlink Control Channel (ePDCCH), wherein, the PUCCH is used for carrying positive acknowledgement/negative acknowledgement (ACK/NACK) information about a Physical Downlink Shared Channel (PDSCH) indicated by the ePDCCH;

wherein, the apparatus determining a channel resource index $n_{PUCCH}^{(1)}$ of the PUCCH according to an antenna port index and any one or both of a physical resource block and an enhanced Control Channel Element (eCCE) of an ePDCCH comprises: determining an offset based on the following information or a combination thereof:

antenna port information, indication signaling, a transmission mode of the ePDCCH, a position of the ePDCCH in the physical resource block, an eCCE index corresponding to the ePDCCH, and an enhanced resource unit group index corresponding to the ePDCCH;

wherein, the determining offset further comprises the following steps or a combination thereof:

A) establishing the correspondence between the antenna port information and the offset, determining the offset according to the antenna port information used by the ePDCCH, wherein, the antenna port information used by the ePDCCH includes an antenna port index, or the antenna port information used by the ePDCCH includes an antenna port index and initial sequence information corresponding to the antenna port, B) establishing the correspondence between the antenna port information and the offset, and determining the offset according to the antenna port information used by the ePDCCH and the indication signaling, D) when the ePDDCH is in a distributed transmission mode, the offset being 0 or determined according to the indication signaling, and when the ePDCCH is in a localized transmission mode, determining an offset corresponding to the ePDCCH in a localized transmission mode according to any of the steps A and B;

wherein, in the step B, the determining the offset according to the antenna port information used by the ePDCCH and indication signaling comprises:

Offset=offset1+ARI, wherein, offset1 is determined according to the antenna port index of the ePDCCH, and the ARI value is configured by the indication signaling, and wherein, the determining the offset according to a combination of the step B and the step D comprises:

Offset=offset1+ARI, wherein, when the ePDCCH is in a distributed transmission mode, offset1 is 0, and when the ePDCCH is in a localized transmission mode, offset1 is determined according to the antenna port index of the ePDCCH, and the ARI value is configured by the indication signaling.

2. The method according to claim 1, wherein, in the step of an apparatus determining a channel resource index $n_{PUCCH}^{(1)}$ of the PUCCH according to physical resources of an ePDCCH, physical resources for transmitting the ePDCCH in a distributed transmission mode and physical resources for transmitting the ePDCCH in a localized transmission mode share a same region;

or the physical resources for transmitting the ePDCCH in a distributed transmission mode and the physical resources for transmitting the ePDCCH in a localized transmission mode are configured independently.

3. The method according to claim 1, wherein, the step of an apparatus determining a channel resource index $n_{PUCCH}^{(1)}$ of the PUCCH according to physical resources of an ePDCCH comprises: the apparatus determining an initial position $N_{PUCCH}^{Start}$ of channel resources of the PUCCH;

wherein, the $N_{PUCCH}^{Start}$ is an initial position $N_{PUCCH}^{(1)}$ of channel resources of a PUCCH corresponding to an existing PDCCH, or, the $N_{PUCCH}^{Start}$ is the initial position $N_{PUCCH}^{(1)}$ of the channel resources of the PUCCH corresponding to the existing PDCCH plus a predefined value D, wherein, the D represents a maximum number of channel resources of the PUCCH corresponding to the PDCCH in an uplink subframe where the PUCCH is located; or the D represents a number of Control Channel Elements (CCEs) in the subframe where the ePDCCH is located, or, the $N_{PUCCH}^{Start}$ is the initial position $N_{PUCCH}^{(1)}$ of the channel resources of the PUCCH corresponding to the existing PDCCH plus the predefined value D plus V, wherein, the V is determined by signaling, or, the $N_{PUCCH}^{Start}$ is determined by signaling, or, the $N_{PUCCH}^{Start}$ is an initial position of PUCCH format 1a/1b resources in the uplink subframe where the PUCCH is located; and wherein, in the step of the apparatus determining an initial position $N_{PUCCH}^{Start}$ of channel resources of the PUCCH, for a time division duplex system, the $N_{PUCCH}^{Start}$ s are same or different in different uplink subframes, or, the $N_{PUCCH}^{Start}$ s of channel resources of the PUCCH corresponding to the ePDCCH in different transmission modes are same or different.

4. The method according to claim 1, wherein, the step of an apparatus determining a channel resource index $n_{PUCCH}^{(1)}$ of the PUCCH according to physical resources of an ePDCCH comprises:

the apparatus determining the $n_{PUCCH}^{(1)}$ according to the following equation:

$n_{PUCCH}^{(1)} = f(n_{PR}) + \text{offset} + N_{PUCCH}^{Start}$;

wherein, the $n_{PR}$ is a renumbered physical resource block index for carrying the ePDCCH, or $n_{PR}$ is an eCCE index for carrying the ePDCCH; and the $N_{PUCCH}^{Start}$ is an initial position of the channel resources of the PUCCH.

5. The method according to claim 1, wherein, when the apparatus transmits all ACKs/NACKs of the PDSCH on M downlink subframes on an uplink subframe n, the step of an apparatus determining the channel resource index $n_{PUCCH}^{(1)}$ of the PUCCH according to physical resources of an ePDCCH comprises:

for a downlink subframe k, the apparatus determining a channel resource index $n_{PUCCH,m}^{(1)}$ of the PUCCH according to a physical resource index $n_{PR}$ of the ePDCCH on the downlink subframe k:

$n_{PUCCH,m}^{(1)} = (M-m-1) \times N_x + m \times N_x + f(n_{PR}) + \text{offset} + N_{PUCCH}^{Start}$;

wherein, m is a sequence number of the downlink subframe k where the received PDSCH is located in the M downlink subframes corresponding to the uplink subframe n, and $0 \leq m \leq M-1$; $N_x$ is a predefined parameter, and a selection of X ensures $N_x \leq f(n_{PR}) + \text{offset} \leq N_{x+1}$, $x \in \{0, 1, \ldots, r-1\}$ and $$N_x = \left\lfloor \frac{N_{ePDCCH}^{Total}}{r} \right\rfloor \times x, \text{ or } N_x = \left\lfloor \frac{N_{ePDCCH}^{Total} \times x}{r} \right\rfloor, \text{ or }$$

$$N_x = \left\lfloor N_{ePDCCH}^{Total} \times \frac{x}{r} \right\rfloor, \text{ or } N_x = \left\lfloor \frac{N_{ePDCCH}^{Total}}{r} \times x \right\rfloor,$$

$N_{ePDCCH}^{Total}$ represents a total number of PUCCHs corresponding to the ePDCCH region of one downlink subframe or is indicated by the signaling; r is greater than or equal to 1; $n_{PR}$ is a renumbered physical resource block index for carrying the ePDCCH, or $n_{PR}$ is an eCCE index for carrying the ePDCCH; and the $N_{PUCCH}^{Start}$ is an initial position of the channel resources of the PUCCH, or, wherein, when the apparatus transmits all ACKs/NACKs of the PDSCH on M downlink subframes on an uplink subframe n, the step of an apparatus determining the channel resource index $n_{PUCCH}^{(1)}$ of the PUCCH according to physical resources of an ePDCCH comprises:

for a downlink subframe k, the apparatus determining the channel resource index $n_{PUCCH,m}^{(1)}$ of the PUCCH according to a physical resource index $n_{PR}$ of the ePDCCH on the downlink subframe k:

$$n_{PUCCH,m}^{(1)} = \sum_{q=0}^{m} N_{ePDCCH,q}^{Total} + f(n_{PR}) + \text{offset} + N_{PUCCH}^{Start};$$

wherein, m is a sequence number of the downlink subframe k where the received PDSCH is located in the M downlink subframes corresponding to the uplink subframe n, and $0 \leq m \leq M-1$; $N_{ePDCCH,m}^{Total}$ represents a total number of PUCCHs corresponding to the ePDCCH region of the downlink subframe k or is indicated by the signaling; the $n_{PR}$ is a renumbered physical resource block index for carrying the ePDCCH, or the $n_{PR}$ is an eCCE index for carrying the ePDCCH; and the $N_{PUCCH}^{Start}$ is an initial position of the channel resources of the PUCCH.

6. The method according to claim 4, wherein, when the $n_{PR}$ is $n_{PRB}$, the $n_{PRB}$ is a renumbered physical resource block index for carrying the ePDCCH, the $$f(n_{PR}) = f(n_{PRB}) = n_{PRB} \times h; \text{ the } n_{PRB} = \left\lfloor \frac{n_{eCCE}}{h} \right\rfloor,$$

the $n_{eCCE}$ is an eCCE index for carrying the ePDCCH;

wherein, the h is a maximum number of the uplink control channel resources corresponding to one physical resource block carrying the ePDCCH, or the h is a number of eCCEs included in one physical resource block carrying the ePDCCH, or the h is indicated by signaling, or the h is a predefined positive integer;

and, the method further comprises: the apparatus determining $n_{PRB}$ by means of:

for the ePDCCH in a localized transmission mode, determining that the $n_{PRB}$ is a renumbered maximum or minimum physical resource block index for carrying the ePDCCH; or, for the ePDCCH in a distributed transmission mode, determining the $n_{PRB}$ according to the maximum or minimum D-eCCE index for carrying the ePDCCH; wherein, the D-eCCE is an eCCE for the ePDCCH in the distributed transmission mode, and, wherein, the step of determining the $n_{PRB}$ according to the maximum or minimum D-eCCE index for carrying the ePDCCH comprises:

mapping one D-eCCE onto h physical resource blocks, and dividing all numbered D-eCCEs into N groups, wherein, each group includes h D-eCCEs; establishing one-to-one correspondence between h D-eCCEs in one group and the h physical resource blocks, wherein, h D-eCCEs in a same group correspond to a same antenna port and are mapped onto a same physical resource block, or h D-eCCEs in a same group are mapped onto a same physical resource block; and determining the physical resource block index $n_{PRB}$ according to a physical resource block index corresponding to a position of the maximum or minimum D-eCCE index for carrying the ePDCCH in the above divided groups;

or when the maximum or minimum D-eCCE index is an odd number, determining that the physical resource block index $n_{PRB}$ is a minimum physical resource block index where the maximum or minimum D-eCCE index is located, and when the maximum or minimum D-eCCE index is an even number, determining that the physical resource block index $n_{PRB}$ is a maximum physical resource block index where the maximum or minimum D-eCCE index is located;

or when the maximum or minimum D-eCCE index is an odd number, determining that the physical resource block index $n_{PRB}$ is a maximum physical resource block index where the maximum or minimum D-eCCE index is located, and when the maximum or minimum D-eCCE index is an even number, determining that the physical resource block index $n_{PRB}$ is a minimum physical resource block index where the maximum or minimum D-eCCE index is located.

7. The method according to claim 4, wherein, when the $n_{PR}$ is $n_{eccE}$, and the $n_{eccE}$ is an eCCE index for carrying the ePDCCH, the $$f(n_{PR}) = \left\lfloor \frac{n_{eCCE}}{h} \right\rfloor$$

or the $f(n_{PR}) = n_{eCCE}$;

wherein, the h is a maximum number of the uplink control channel resources corresponding to one physical resource block carrying the ePDCCH, or the h is a number of eCCEs included in one physical resource block carrying the ePDCCH, or the h is indicated by signaling, or the h is a predefined positive integer;

and, the method further comprises: the apparatus determining the $n_{eccE}$ by means of:

for the ePDCCH in a localized transmission mode, determining that the $n_{eccE}$ is a maximum or minimum L-eCCE index for carrying the ePDCCH; or determining that the $n_{eccE}$ is a maximum or minimum L-eCCE index for carrying the ePDCCH plus Total-DeCCE; wherein, the Total-DeCCE represents a total number of available D-eCCEs or is indicated by signaling; or, for the ePDCCH in a distributed transmission mode, determining the $n_{eccE}$ according to the maximum or minimum D-eCCE index for carrying the ePDCCH, and, wherein, the step of determining the $n_{eccE}$ according to the maximum or minimum D-eCCE index for carrying the ePDCCH comprises:

determining that the $n_{eccE}$ is a maximum or minimum D-eCCE index for carrying the ePDCCH;

or determining that the $n_{eccE}$ is a maximum or minimum D-eCCE index for carrying the ePDCCH plus Total-LeCCE; wherein, the Total-DeCCE represents a total number of available L-eCCEs or is indicated by signaling;

or mapping one D-eCCE onto h L-eCCEs, and dividing all numbered D-eCCEs into N groups, wherein, each group includes h D-eCCEs; establishing one-to-one correspondence between h D-eCCEs in one group and the h L-eCCEs, wherein, h D-eCCEs in a same group correspond to a same antenna port and are mapped onto a same L-eCCE, or h D-eCCEs in a same group are mapped onto a same L-eCCE; and determining $n_{eccE}$ according to an L-eCCE index corresponding to a position of the maximum or minimum D-eCCE index for carrying the ePDCCH in the above divided groups;

or mapping one D-eCCE onto 2 L-eCCEs, when the maximum or minimum D-eCCE index is an odd number, determining that the $n_{eccE}$ is a minimum L-eCCE index where the maximum or minimum D-eCCE index is located, and when the maximum or minimum D-eCCE index is an even number, determining that the $n_{eccE}$ is a maximum L-eCCE index where the maximum or minimum D-eCCE index is located; or when the maximum or minimum D-eCCE index is an odd number, determining that the $n_{eccE}$ is a maximum L-eCCE index where the maximum or minimum D-eCCE index is located, and when the maximum or minimum D-eCCE index is an even number, determining that the $n_{eccE}$ is a minimum L-eCCE index where the maximum or minimum D-eCCE index is located;

wherein, the L-eCCE is an eCCE for the ePDCCH in the localized transmission mode, and the D-eCCE is an eCCE for the ePDCCH in the distributed transmission mode.

8. The method according to claim 4, further comprising: the apparatus numbering the physical resources of the ePDCCHs according to one of the following modes:

numbering all configured physical resources of the ePDCCHs in order;

firstly concatenating physical resources for ePDCCHs in different transmission modes, and then numbering the physical resources of the ePDCCHs in the concatenated order; and numbering the physical resources for the ePDCCHs in different transmission modes respectively.

9. An apparatus, comprising:

a memory;

wherein the memory is configured to cause the apparatus to perform actions comprising:

a channel resource determination unit, configured to determine a channel resource index $n_{PUCCH}^{(1)}$ of a Physical Uplink Control Channel (PUCCH) according to an antenna port index and any one or both of a physical resource block and an enhanced Control Channel Element (eCCE) of an enhanced Physical Downlink Control Channel (ePDCCH), wherein, the PUCCH is used for carrying positive acknowledgement/negative acknowledgement (ACK/NACK) information about a Physical Downlink Shared Channel (PDSCH) indicated by the ePDCCH;

wherein, the channel resource determination unit is configured to determine an offset based on the following information or a combination thereof:

antenna port information, indication signaling, a transmission mode of the ePDCCH, a position of the ePDCCH in the physical resource block, an eCCE index corresponding to the ePDCCH, and an enhanced resource unit group index corresponding to the ePDCCH;

wherein, the channel resource determination unit is further configured to determine the offset according to the following steps or a combination thereof:

A) establishing a correspondence between the antenna port information and the offset, determining the offset according to the antenna port information used by the ePDCCH, wherein, the antenna port information used by the ePDCCH includes an antenna port index; or the antenna port information used by the ePDCCH includes an antenna port index and initial sequence information corresponding to the antenna port;

B) establishing a correspondence between the antenna port information and the offset, and determining the offset according to the antenna port information used by the ePDCCH and the indication signaling;

D) when the ePDDCH is in a distributed transmission mode, the offset being 0 or determined according to the indication signaling, and when the ePDCCH is in a localized transmission mode, determining an offset corresponding to the ePDCCH in a localized transmission mode according to any of the steps A and B, wherein, in the step B, the determining offset according to the antenna port information used by the ePDCCH and indication signaling comprises:

Offset=offset1+ARI, wherein, offset1 is determined according to the antenna port index of the ePDCCH, and the ARI value is configured by the indication signaling, and wherein, the determining an offset according to a combination of the step B and the step D comprises:

Offset=offset1+ARI, wherein, when the ePDCCH is in a distributed transmission mode, offset1 is 0, and when the ePDCCH is in a localized transmission mode, offset1 is determined according to the antenna port index of the ePDCCH, and the ARI value is configured by the indication signaling.

10. The apparatus according to claim 9, wherein, the channel resource determination unit is configured to determine an initial position $N_{PUCCH}^{Start}$ of channel resources of the PUCCH;

wherein, the $N_{PUCCH}^{Start}$ is an initial position $N_{PUCCH}^{(1)}$ of channel resources of a PUCCH corresponding to an existing PDCCH, or, the $N_{PUCCH}^{Start}$ is the initial position $N_{PUCCH}^{(1)}$ of the channel resources of the PUCCH corresponding to the existing PDCCH plus a predefined value D, wherein, the D represents a maximum number of channel resources of the PUCCH corresponding to the PDCCH in an uplink subframe where the PUCCH is located; or the D represents a number of Control Channel Elements (CCEs) in an subframe where the ePDCCH is located, or, the $N_{PUCCH}^{Start}$ is the initial position $N_{PUCCH}^{(1)}$ of the channel resources of the PUCCH corresponding to the existing PDCCH plus the predefined value D plus V, wherein, the V is determined by signaling, or, the $N_{PUCCH}^{Start}$ is determined by signaling, or, the $N_{PUCCH}^{Start}$ is an initial position of PUCCH format 1a/1b resources in the uplink subframe where the PUCCH is located; and wherein, for a time division duplex system, the $N_{PUCCH}^{Start}$s are same or different in different uplink subframes, or, wherein, $N_{PUCCH}^{Start}$s of channel resources of the PUCCH corresponding to the ePDCCH in different transmission modes are same or different.

11. The apparatus according to claim 9, wherein, the channel resource determination unit is configured to determine a channel resource index $n_{PUCCH}^{(1)}$ of a PUCCH according to the physical resources of an ePDCCH by means of:

determining the $n_{PUCCH}^{(1)}$ according to the following equation:

$$n_{PUCCH}^{(1)}=f(n_{PR})+\text{offset}+N_{PUCCH}^{Start}$$

wherein, the $n_{PR}$ is a renumbered physical resource block index for carrying the ePDCCH, or the $n_{PR}$ is an enhanced control channel element index for carrying the ePDCCH; and the $N_{PUCCH}^{Start}$ is an initial position of the channel resources of the PUCCH.

12. The apparatus according to claim 11, wherein, when the $n_{PR}$ is $n_{PRB}$, and the $n_{PRB}$ is a renumbered physical resource block index for carrying the ePDCCH, $$f(n_{PR}) = f(n_{PRB}) = n_{PRB} \times h;\text{ the } n_{PRB} = \left\lfloor \frac{n_{eCCE}}{h} \right\rfloor,$$

$n_{eccE}$ is an enhanced control channel element index for carrying the ePDCCH;

wherein, the h is a maximum number of the uplink control channel resources corresponding to one physical resource block carrying the ePDCCH, or the h is a number of enhanced control channel elements included in one physical resource block carrying the ePDCCH, or the h is indicated by signaling, or the h is a predefined positive integer;

and, wherein, the channel resource determination unit is further configured to determine the $n_{PRB}$ by means of:

for the ePDCCH in a localized transmission mode, determining that the $n_{PRB}$ is a renumbered maximum or minimum physical resource block index for carrying the ePDCCH; or, for the ePDCCH in a distributed transmission mode, determining the $n_{PRB}$ according to the maximum or minimum D-eCCE index for carrying the ePDCCH; wherein, the D-eCCE is an enhanced control channel element for the ePDCCH in the distributed transmission mode, and, wherein, the channel resource determination unit is further configured to determine the $n_{PRB}$ according to the maximum or minimum D-eCCE index for carrying the ePDCCH by means of:

mapping one D-eCCE onto h physical resource blocks, and dividing all numbered D-eCCEs into N groups, wherein, each group includes h D-eCCEs; establishing one-to-one correspondence between h D-eCCEs in one group and the h physical resource blocks, wherein, the h D-eCCEs in a same group correspond to a same antenna port and are mapped onto a same physical resource block, or the h D-eCCEs in a same group are mapped onto a same physical resource block; and determining the physical resource block index $n_{PRB}$ according to a physical resource block index corresponding to a position of the maximum or minimum D-eCCE index for carrying the ePDCCH in the above divided groups;

or when the maximum or minimum D-eCCE index is an odd number, determining that the physical resource block index $n_{PRB}$ is a minimum physical resource block index where the maximum or minimum D-eCCE index is located, and when the maximum or minimum D-eCCE index is an even number, determining that the physical resource block index $n_{PRB}$ is a maximum physical resource block index where the maximum or minimum D-eCCE index is located;

or when the maximum or minimum D-eCCE index is an odd number, determining that the physical resource block index $n_{PRB}$ is a maximum physical resource block index where the maximum or minimum D-eCCE index is located, and when the maximum or minimum D-eCCE index is an even number, determining that the physical resource block index $n_{PRB}$ is a minimum physical resource block index where the maximum or minimum D-eCCE index is located.

13. The apparatus according to claim 11, wherein, when the $n_{PR}$ is $n_{eccE}$, and the $n_{eccE}$ is an enhanced control channel element index for carrying the ePDCCH, $$f(n_{PR}) = \left\lfloor \frac{n_{eCCE}}{h} \right\rfloor \text{ or } f(n_{PR}) = n_{eCCE};$$

wherein, the h is a maximum number of the uplink control channel resources corresponding to one physical resource block carrying the ePDCCH, or the h is a number of enhanced control channel elements included in one physical resource block carrying the ePDCCH, or the h is indicated by signaling, or the h is a predefined positive integer;

and, wherein, the channel resource determination unit is further configured to determine $n_{eCCE}$ by means of:

for the ePDCCH in a localized transmission mode, determining that the $n_{eccE}$ is a maximum or minimum L-eCCE index for carrying the ePDCCH; or determining that the $n_{eccE}$ is a maximum or minimum L-eCCE index for carrying the ePDCCH plus Total-DeCCE; wherein, the Total-DeCCE represents a total number of available D-eCCEs or is indicated by signaling; or, for the ePDCCH in a distributed transmission mode, determining the $n_{eccE}$ according to the maximum or minimum D-eCCE index for carrying the ePDCCH, and, wherein, the channel resource determination unit is further configured to determine the $n_{eccE}$ according to the maximum or minimum D-eCCE index for carrying the ePDCCH by means of:

determining that the $n_{eccE}$ is a maximum or minimum D-eCCE index for carrying the ePDCCH;

or determining that the $n_{eccE}$ is a maximum or minimum D-eCCE index for carrying the ePDCCH plus Total-LeCCE; wherein, the Total-LeCCE represents a total number of available L-eCCEs or is indicated by signaling;

or mapping one D-eCCE onto h L-eCCEs, and dividing all numbered D-eCCEs into N groups, wherein, each group includes h D-eCCEs; establishing one-to-one correspondence between h D-eCCEs in one group and the h L-eCCEs, wherein, the h D-eCCEs in a same group correspond to a same antenna port and are mapped onto a same L-eCCE, or the h D-eCCEs in a same group are mapped onto the same L-eCCE; and determining $n_{eccE}$ according to an L-eCCE index corresponding to a position of the maximum or minimum D-eCCE index for carrying the ePDCCH in the above divided groups;

or mapping one D-eCCE onto 2 L-eCCEs, when the maximum or minimum D-eCCE index is an odd number, determining that the $n_{eccE}$ is a minimum L-eCCE index where the maximum or minimum D-eCCE index is located, and when the maximum or minimum D-eCCE index is an even number, determining that the $n_{eccE}$ is a maximum L-eCCE index where the maximum or minimum D-eCCE index is located; or when the maximum or minimum D-eCCE index is an odd number, determining that the $n_{eccE}$ is a maximum L-eCCE index where the maximum or minimum D-eCCE index is located, and when the maximum or minimum D-eCCE index is an even number, determining that the $n_{eccE}$ is a minimum L-eCCE index where the maximum or minimum D-eCCE index is located;

wherein, the L-eCCE is an enhanced control channel element for the ePDCCH in the localized transmission mode, and the D-eCCE is an enhanced control channel element for the ePDCCH in the distributed transmission mode.

14. The apparatus according to claim 11, wherein, the channel resource determination unit is further configured to number the physical resources of the ePDCCH according to one of the following modes:

numbering all configured physical resources of the ePDCCHs in order;

firstly concatenating physical resources for ePDCCHs in different transmission modes, and then numbering the physical resources of the ePDCCHs in the concatenated order; and numbering the physical resources for the ePDCCHs in different transmission modes respectively.

15. The apparatus according to claim 9, wherein, the apparatus is a terminal or a base station.

16. The apparatus according to claim 9, wherein, when the apparatus transmits all ACKs/NACKs of the PDSCH on M downlink subframes on an uplink subframe n, the channel resource determination unit is configured to determine the channel resource index $n_{PUCCH}^{(1)}$ of the PUCCH according to the physical resources of the ePDCCH by means of:

for a downlink subframe k, the apparatus determining a channel resource index $n_{PUCCH,m}^{(1)}$ of the PUCCH according to a physical resource index $n_{PR}$ of the ePDCCH on the downlink subframe k:

$n_{PUCCH,m}^{(1)} = (M-m-1) \times N_x + m \times N_x + f(n_{PR}) + \text{offset} + N_{PUCCH}^{Start};$ wherein, m is a sequence number of the downlink subframe k where the received PDSCH is located in the M downlink subframes corresponding to the uplink subframe n, and $0 \leq m \leq M-1$; $N_x$ is a predefined parameter, and the selection of x ensures $N_x \leq f(n_{PR})+\text{offset} \leq N_{x+1}$, $x \in \{0, 1, \ldots, r-1\}$ and $$N_x = \left\lfloor \frac{N_{ePDCCH}^{Total}}{r} \right\rfloor \times x, \text{ or } N_x = \left\lfloor \frac{N_{ePDCCH}^{Total} \times x}{r} \right\rfloor, \text{ or}$$

$$N_x = \left\lfloor N_{ePDCCH}^{Total} \times \frac{x}{r} \right\rfloor, \text{ or } N_x = \left\lceil \frac{N_{ePDCCH}^{Total}}{r} \times x \right\rceil,$$

$N_{ePDCCH}^{Total}$ represents a total number of PUCCHs corresponding to the ePDCCH region of one downlink subframe or is indicated by the signaling; r is greater than or equal to 1; the $n_{PR}$ is a renumbered physical resource block index for carrying the ePDCCH, or the $n_{PR}$ is an enhanced control channel element index for carrying the ePDCCH; and the $N_{PUCCH}^{Start}$ is an initial position of the channel resources of the PUCCH, or, wherein, when the apparatus transmits all ACKs/NACKs of the PDSCH on M downlink subframes on an uplink subframe n, the channel resource determination unit is configured to determine the channel resource index $n_{PUCCH}^{(1)}$ of the PUCCH according to the physical resources of the ePDCCH by means of:

for a downlink subframe k, the apparatus determining a channel resource index $n_{PUCCH,m}^{(1)}$ of the PUCCH according to a physical resource index $n_{PR}$ of the ePDCCH on the downlink subframe k:

$$n_{PUCCH,m}^{(1)} = \sum_{q=0}^{m} N_{ePDCCH,q}^{Total} + f(n_{PR}) + \text{offset} + N_{PUCCH}^{Start};$$

wherein, m is a sequence number of the downlink subframe k where the received PDSCH is located in the M downlink subframes corresponding to the uplink subframe n, and $0 \leq m \leq M-1$; $N_{ePDCCH,m}^{Total}$ represents a total number of PUCCHs corresponding to the ePDCCH region of the downlink subframe k or is indicated by the signaling; the $n_{PR}$ is a renumbered physical resource block index for carrying the ePDCCH, or the $n_{PR}$ is an enhanced control channel element index for carrying the ePDCCH; and the $N_{PUCCH}^{Start}$ is an initial position of the channel resources of the PUCCH.

* * * * *